US012117384B1

(12) United States Patent
Bentz et al.

(10) Patent No.: US 12,117,384 B1
(45) Date of Patent: Oct. 15, 2024

(54) UTILIZING HIGHLY SCATTERED LIGHT FOR INTELLIGENCE THROUGH AEROSOLS

(71) Applicant: National Technology & Engineering Solutions of Sandia, LLC, Albuquerque, NM (US)

(72) Inventors: Brian Z. Bentz, Albuquerque, NM (US); Jeremy Benjamin Wright, Albuquerque, NM (US); John D. Vander Laan, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 279 days.

(21) Appl. No.: 17/702,347

(22) Filed: Mar. 23, 2022

Related U.S. Application Data

(60) Provisional application No. 63/174,145, filed on Apr. 13, 2021.

(51) Int. Cl.
*G01N 15/0205* (2024.01)
*G01N 15/06* (2024.01)
*G01N 15/075* (2024.01)

(52) U.S. Cl.
CPC ......... *G01N 15/0205* (2013.01); *G01N 15/06* (2013.01); *G01N 15/075* (2024.01)

(58) Field of Classification Search
CPC ... G01N 15/0205; G01N 15/06; G01N 15/075
USPC .......................................................... 356/219
See application file for complete search history.

(56) References Cited

U.S. PATENT DOCUMENTS 6,011,626 A * 1/2000 Hielscher ............... G01N 21/21 356/369
6,252,972 B1 * 6/2001 Linnartz ............... G06T 1/0078 382/100
6,850,656 B1 * 2/2005 Bevilacqua ............ G01N 21/49 385/12

(Continued)

FOREIGN PATENT DOCUMENTS

CA 2639677 A1 * 3/2010 ......... G01N 15/0205

OTHER PUBLICATIONS

Anatoli P. Nefedov, Oleg F. Petrov, Olga S. Vaulina, and Andrey M. Lipaev, "Application of a forward-angle-scattering transmissometer for simultaneous measurements of particle size and number density in an optically dense medium," Appl. Opt. 37, 1682-1689 (1998) (Year: 1998).*

(Continued)

*Primary Examiner* — Michelle M Iacoletti
*Assistant Examiner* — Noah J. Haney
(74) *Attorney, Agent, or Firm* — Mark A. Dodd

(57) ABSTRACT

A method for modeling light transport through a scattering medium prior to being incident on a detector and a corresponding system is disclosed. The method determines the effects of scattering and absorption caused by particles as a function of the density, size, and refractive index of the particles, as well as the wavelength of the light source. Based on the determined scattering and absorption coefficients, the signal incident on the detector may be calculated. The calculation may also be inverted such that based upon the detected signal, an object may be detected, and its location in the scattering medium may be estimated.

20 Claims, 15 Drawing Sheets

(56) References Cited

U.S. PATENT DOCUMENTS

| | | | | |
|---|---|---|---|---|
| 2003/0117622 | A1* | 6/2003 | Sevick-Muraca | G01N 21/51 356/338 |
| 2008/0060455 | A1* | 3/2008 | Coyle | G01N 1/4022 73/863.12 |
| 2010/0002233 | A1* | 1/2010 | Van Herpen | A61B 5/4312 356/432 |
| 2011/0057670 | A1* | 3/2011 | Jordan | G06F 3/0443 324/679 |
| 2011/0286000 | A1* | 11/2011 | Hu | G01N 21/4738 356/445 |
| 2012/0218549 | A1* | 8/2012 | Gautron | G01N 15/1459 356/337 |
| 2012/0281085 | A1* | 11/2012 | Ingram, Jr. | G06V 20/13 348/135 |
| 2014/0247450 | A1* | 9/2014 | Han | G01N 15/0211 356/338 |
| 2014/0320639 | A1* | 10/2014 | Schoeberl | G01N 15/0205 348/135 |
| 2019/0360915 | A1* | 11/2019 | Foster | G01N 15/1425 |
| 2020/0025665 | A1* | 1/2020 | Trainer | G01N 21/53 |
| 2020/0359887 | A1* | 11/2020 | Avanaki | A61B 5/0066 |
| 2022/0172335 | A1* | 6/2022 | Mian | G01N 21/8806 |

OTHER PUBLICATIONS

Bentz, B. Z. et al., “Multiresolution Localization With Temporal Scanning for Super-Resolution Diffuse Optical Imaging of Fluorescence,” IEEE Transactions on Image Processing (2020) 29:830-842.

Bentz, B. Z. et al., “Superresolution Diffuse Optical Imaging by Localization of Fluorescence,” Physical Review Applied (2018) 10:034021, 13 pages.

Bentz, B. Z. et al., “Localization of Fluorescent Targets in Deep Tissue With Expanded Beam Illumination for Studies of Cancer and the Brain,” IEEE Transactions on Medical Imaging (2020) 39(7):2472-2481.

Bentz, B. Z. et al., “Light transport with weak angular dependence in fog,” Optics Express (2021) 29(9/26), 15 pages.

Bentz, B. Z. et al., “Towards computational imaging for intelligence in highly scattering aerosols,” Situation Awareness in Degraded Environments (2020) Sanders-Reed, J. N. and Arthur III, J. J. (eds.) Proc. of SPIE 11424:1142405, 11 pages.

Berk, A. et al., “MODTRAN® 6: A major upgrade of the MODTRAN® radiative transfer code,” Algorithms and Technologies for Multispectral, Hyperspectral, and Ultraspectral Imagery XX, Velez-Reyes, M. and Kruse, F. A. (eds.) Proc. of SPIE, 9088:90880H, 7 pages.

Garland, J. A., “Some fog droplet size distributions obtained by an impaction method,” Quart. J. R. Met. Soc. (1971) 97:483-494.

Huang, D. et al., “Optical Coherence Tomography,” Science (1991) 254:1178-1181.

Mosk, A. et al., “Imaging, Sensing, and Communication Through Highly Scattering Complex Media,” Final Report for DARPA Award HR0011-15-2-0003, Nov. 24, 2015, 50 pages.

Schweiger, M. et al., “The Toast++ software suite for foward and inverse modeling in optical tomography,” Journal of Biomedical Optics (2014) 19(4):040801, 15 pages.

Tsai, E. H. R. et al., “In vivo mouse florescence imaging for folate-targeted delivery and release kinetics,” Biomedical Optics Express (2014) 5(8):2662-2678.

Van Der Laan, J. D. et al., “Evolution of circular and linear polarization in scattering environments,” Optics Express (2015) 23(25):31874-31888.

Van Der Laan, J. D. et al., “Superior signal persistence of circularly polarized light in polydisperse, real-world fog environments,” Applied Optics (2018) 57(19):5464-5473.

Van Putten, E. G. et al., “Scattering Lens Resolves Sub-100 nm Structures with Visible Light,” Physical Review Letters (2011) 106:193905, 4 pages.

* cited by examiner

UTILIZING HIGHLY SCATTERED LIGHT FOR INTELLIGENCE THROUGH AEROSOLS

RELATED APPLICATIONS

This application claims priority to U.S. Provisional Application No. 63/174,145, filed on Apr. 13, 2021, and entitled UTILIZING HIGHLY SCATTERED LIGHT FOR INTELLIGENCE THROUGH AEROSOLS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a system and corresponding method for imaging in the visible and infrared spectrum through aerosols.

BACKGROUND

Light in media like aerosols is plagued by absorption and scattering interactions that attenuate and change the propagation direction of the light. This attenuation and scattering reduce situational awareness and may cause unacceptable down-time for critical systems or operations. These interactions can be characterized by a scattering mean free path $l_s$, which is the average distanced traveled by a photon between scattering events, and a transport mean free path $l_t$, which is the average distance over which a photon's propagation direction becomes random. Both $l_s$ and $l_t$ depend on the wavelength of the light and the size distribution and refractive index of the particles that the light interacts with. For a given path length distance R through the aerosol, the optical depth, $\tau=R/l_s$, is the path length in units of $l_s$, and the transport optical depth, $\tau=R/l_t$, is the path length in units of $l_t$. For visible light in fog, $l_s \approx l_t$ and $\tau=5\tau_t$.

When the effect of scattering is dominant, as is often the case at visible wavelengths, information becomes scrambled and difficult to decipher. For example, collimated light will become effectively isotropic after propagating R=2/1. Therefore, one can consider $\tau_t \leq 2$ or so to be a moderately scattering regime and $\tau_t \geq 2$ or so to be a highly scattering regime. In both cases, information becomes scrambled and difficult to decipher so that aerosols that are naturally occurring or man-made can impact security, transportation, aviation, remote sensing, surveillance, astronomy, and more. Fog is particularly concerning because it occurs in all climates and at certain locations with high frequency.

To improve the situation, methods have been developed to reduce the effects of scatter on imaging. The methods generally discriminate between ballistic light, i.e., light that has traveled in a straight line from an object to a detector or lens system and scattered light, i.e., light that has changed propagation direction many times on the way to the detector. The ballistic light contains much more information than the scattered light and can form a high-resolution image of an object if the scattered light is rejected. For example, polarizing filters can reject scattered light that is in a different polarization state than the source light. See, for example, J. D. van der Laan et al., "Evolution of circular and linear polarization in scattering environments," Optics Express, vol. 23, pp. 31874-31888 (2015), the contents of which are incorporated herein by reference. Similarly, temporal and coherence gating methods can selectively detect ballistic photons. See, for example, D. Huang et al., "Optical Coherence Tomography," Science, vol. 254, pp. 1178-1181 (1991), the contents of which are incorporated herein by reference. However, because the intensity of ballistic light decays exponentially with depth according to the Beer-Lambert law, imaging is possible only in the moderately scattering regime.

If both the ballistic and scattered photons could be used to form an image, sensing and imaging to depths of perhaps at least 10 $l_t$ (limited by the signal-to-noise ratio or SNR) could be possible. See, for example, A. Mosk et al, "Imaging, sensing, and communication through highly scattering complex media," Final Report, Defense Technical Information Center (2015), the contents of which are incorporated herein by reference.

Coherent imaging methods have been explored that take advantage of the wave nature of light and the random interference of waves that have traveled different paths within the scattering media with each other. For example, the coherent intensity pattern of light transmitted through scattering media is called a speckle pattern, and this pattern and its correlations can be exploited for imaging. See, for example, E. van Putten et al., "Scattering Lens Resolves Sub-100 nm Structures with Visible Light," Physical Review Letters, vol. 106, art. no. 193905 (2011), the contents of which are incorporated herein by reference. However, these methods may be challenging to implement in aerosols because the speckle decorrelation is sensitive to moving scatterers. Alternatively, incoherent methods that do not take advantage of the wave nature of light could be naturally insensitive to particle motion in fog. For example, diffuse optical imaging (DOI) methods generally rely on computational imaging to invert a diffusion model that approximates the photon transport in scattering media. Through optimization techniques, it becomes possible to detect objects, estimate the locations of objects, and even recover the shape of objects. See, for example, E. H. Tsai et al., "In vivo mouse fluorescence imaging for folate-targeted delivery and release kinetics," Biomedical Optics Express, vol. 5, pp. 2662-2678 (2014); B. Z. Bentz et al., "Multiresolution Localization With Temporal Scanning for Super-Resolution Diffuse Optical Imaging of Fluorescence," IEEE Transactions on Image Processing, vol. 29, pp. 830-842 (2019); and B. Z. Bentz et al., "Superresolution Diffuse Optical Imaging by Localization of Fluorescence," Physical Review Applied, vol. 10, art. no. 034021 (2018); the contents of each of which are incorporated herein by reference.

In spite of these previous efforts, the need still exists for more precise and more computationally efficient optical transport models.

SUMMARY

One aspect of the present invention relates to a method for modeling light transport through a scattering medium prior to being incident on a detector. The model depends on the scattering and absorption of the scattering medium, which are calculated as a function of the density, size, and refractive index of the scattering particles, as well as the wavelength of the light source. Based on the calculated scattering and absorption coefficients, the signal incident on the detector may be calculated. In other aspects of the invention, the calculation may be inverted such that, based upon the detected signal, an object hidden in the scattering media can be detected, localized, characterized, and imaged.

In at least one embodiment of the present invention, a method for detecting and localizing an object in a scattering medium comprises the steps of determining a macroscopic scattering coefficient of a scattering medium, determining a macroscopic absorption coefficient of the scattering medium, determining a macroscopic averaged anisotropy of the scattering medium, providing a detector, taking an image with the detector, determining an expected background signal, and subtracting the expected background signal from the image.

In other methods for detecting and localizing an object in a scattering medium, the macroscopic scattering coefficient is a function of a particle density in the medium, a particle diameter distribution, and scattering cross-sections of particles that are a function of particle diameter, the macroscopic absorption coefficient is a function of the particle density in the medium, the particle diameter distribution, and absorption cross-sections of particles that are a function of the particle diameter, and the macroscopic averaged anisotropy is a function of a particle density in the medium, a particle diameter distribution, scattering cross-sections of particles that are a function of particle diameter, and anisotropies of particles that are a function of particle diameter; and the image is a two-dimensional image and the detector produces the two-dimensional image.

In yet other methods for detecting and localizing an object in a scattering medium, the method further comprises the step of determining an object is present when a decision statistic is greater than a detection threshold (the step of determining an object is present being based upon a likelihood ratio test); the decision static is a function of a ratio of a probability density in the presence of the object to a probability density in the absence of the object, and the detection threshold is a function of a standard deviation of the decision static and an inverse complimentary error function of a specified false alarm rate; the method further comprises the step of determining a location of the object when the object is determined to be present (the step of determining a location of the object being based upon a maximum likelihood estimation); and the method further comprises the step of determining at least one of a size of the object or a reflectivity of the object (the step of determining at least one of a size of the object or a reflectivity of the object being based upon the maximum likelihood estimation).

In yet other methods for detecting and localizing an object in a scattering medium, the method further comprises the step of determining an object is present (the step of determining an object is present employing a deep learning model); and the method further comprises the step of determining a location of the object when the object is determined to be present (the step of determining a location of the object employing a deep learning model).

In at least one embodiment of the present invention, a system for detecting and localizing an object in a scattering medium comprises a detector that takes an image and outputs the image, a processor that executes instructions, and a memory that stores instructions that, when executed by the processor, cause the processor to perform the steps of determining a macroscopic scattering coefficient of a scattering medium, determining a macroscopic absorption coefficient of the scattering medium, determining a macroscopic averaged anisotropy of the scattering medium, receiving the image from the detector, determining an expected background signal, and subtracting the expected background signal from the image.

In other systems for detecting and localizing an object in a scattering medium, the macroscopic scattering coefficient is a function of a particle density in the medium, a particle diameter distribution, and scattering cross-sections of particles that are a function of particle diameter, the macroscopic absorption coefficient is a function of a particle density in the medium, a particle diameter distribution, and absorption cross-sections of particles that are a function of particle diameter, and the macroscopic averaged anisotropy is a function of a particle density in the medium, a particle diameter distribution, scattering cross-sections of particles that are a function of particle diameter, and anisotropies of particles that are a function of particle diameter; and the system further comprises a transmissometer that measures a particle density in the medium, and a particle sizer that measures a particle diameter distribution in the medium.

In yet other systems for detecting and localizing an object in a scattering medium, the memory further stores instructions that, when executed by the processor, cause the processor to perform the step of determining an object is present when a decision statistic is greater than a detection threshold (the step of determining an object is present being based upon a likelihood ratio test); the decision static is a function of a ratio of a probability density in the presence of the object to a probability density in the absence of the object, and the detection threshold is a function of a standard deviation of the decision static and an inverse complimentary error function of a specified false alarm rate; the memory further stores instructions that, when executed by the processor, cause the processor to perform the step of when the object is determined to be present (determining a location of the object based upon a maximum likelihood estimation); and the memory further stores instructions that, when executed by the processor, cause the processor to perform the step of determining at least one of a size of the object or a reflectivity of the object (the step of determining at least one of a size of the object or a reflectivity of the object being based upon the maximum likelihood estimation).

In still other systems for detecting and localizing an object in a scattering medium, the memory further stores instructions that, when executed by the processor, cause the processor to perform the step of determining an object is present (the step of determining an object is present employing a deep learning model); and the memory further stores instructions that, when executed by the processor, cause the processor to perform the step of determining a location of the object when the object is determined to be present (the step of determining a location of the object employing a deep learning model).

In at least one embodiment of the present invention, a computer-readable storage media comprises instructions to implement steps comprising determining a macroscopic scattering coefficient of a scattering medium, the macroscopic scattering coefficient being a function of a particle density in the medium, a particle diameter distribution, and scattering cross-sections of particles that are a function of particle diameter, determining a macroscopic absorption coefficient of the scattering medium, the macroscopic absorption coefficient being a function of a particle density in the medium, a particle diameter distribution, and absorption cross-sections of particles that are a function of particle diameter, determining a macroscopic averaged anisotropy of the scattering medium, the macroscopic averaged anisotropy being a function of a particle density in the medium, a particle diameter distribution, scattering cross-sections of particles that are a function of particle diameter, and anisotropies of particles that are a function of particle diameter, taking an image with a detector, determining an expected background signal, and subtracting the expected background signal from the image.

In other computer-readable storage media, the computer-readable storage media further comprises the steps of determining an object is present when a decision statistic is greater than a detection threshold (the step of determining an object is present being based upon a likelihood ratio test), and determining a location of the object when the object is determined to be present (the step of determining a location of the object being based upon a maximum likelihood estimation).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 4A illustrates the analytical solution using a model in accordance with one or more embodiments of the present invention for the effect of extinction, fluence rate, and flux density, while

FIG. 6A illustrates the experimental set-up used to confirm the accuracy of a model in accordance with one or more embodiments of the present invention, while

FIGS. 15A and 15C illustrate images taken with a system in accordance with one or more embodiments of the present invention, while

DETAILED DESCRIPTION

Transport Models

Figure 1:
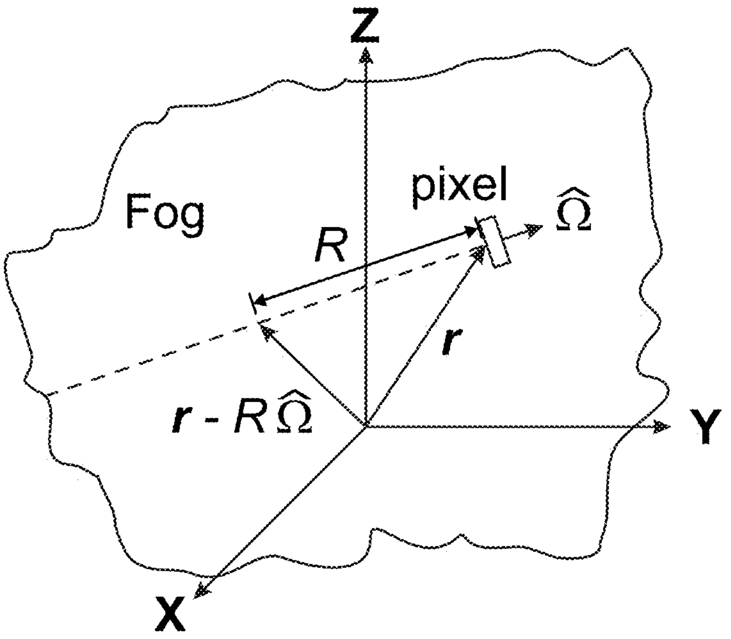
FIG. 1 illustrates the geometry for a model in accordance with one or more embodiments of the present invention.

Propagation of light in scattering media can be described by the Boltzmann or radiative transfer equation (RTE):

$$\frac{1}{c}\frac{\partial}{\partial t}I(r,t,\Omega)+\Omega\cdot\nabla I(r,t,\Omega)+(\mu_a+\mu_s)I(r,t,\Omega)=\mu_s\int_{4\pi}d\Omega' f(\Omega'\to\Omega)I(r,t,\Omega')+Q(r,t,\Omega) \quad \text{(Eq. 1)}$$

where r denotes the position, c is the speed of light in the medium, L(r, t, Ω) (W/m$^2$/sr) is the radiance at time t in direction Ω, $\mu_a$ (m$^{-1}$) is the absorption coefficient, $\mu_s$ is the scattering coefficient (m$^{-1}$), $l_s=1/\mu_s$ is the scattering mean free path, f(Ω'→Ω) is the scattering phase function from incidence direction Ω' to scattering direction Ω, and Ω(r, t, Ω) (W/m$^3$/sr) is the radiance source term. The RTE provides an incoherent model that treats light as particles undergoing elastic collisions within a medium where interference effects are assumed to average to zero. Integrating over the solid angle results in a continuity equation:

$$\frac{1}{c}\frac{\partial}{\partial t}\phi(r,t)+\nabla\cdot J(r,t)+\mu_a\phi(r,t)=S(r,t) \quad \text{(Eq. 2)}$$

where $\phi(r, t)=\int_{4\pi} d\Omega L(r, t, \Omega)$ is the fluence rate (W/m$^2$), $J(r, t)=\int_{4\pi} d\Omega Q(r, t, \Omega)$ is the flux density (W/m$^2$), and $S(r, t)=\int_{4\pi} d\Omega Q(r, t, \Omega)$ is the source (W/m$^3$).

Assuming the radiance is linearly anisotropic with weak angular dependence and expanding Ω to first order:

$$I(r, t, \Omega) = \frac{1}{4\pi}\phi(r, t) + \frac{3}{4\pi}J(r, t)\cdot\Omega. \quad \text{(Eq. 3)}$$

Furthermore, assuming an isotropic source and that the rate of time variation in J is much slower than the collision frequency, it is possible to relate the flux density to the fluence rate, resulting in Fick's law:

$$J(r,t) = -D\nabla\phi(r,t), \quad \text{(Eq. 4)}$$

where the diffusion coefficient $D=1/[3(\mu_s'+\mu_a)]$, $\mu_s'=\mu_s(1-g)$ is the reduced scattering coefficient, g is the average cosine of the scattering angle, or the anisotropy parameter, and $l_t=1/\mu_s'$ is the transport mean free path length. As g decreases from 1, the light becomes less forward scattered, 0 implies isotropic scatter, and negative values imply backwards scattering.

Plugging Equation 4 into Equation 2, the result is the diffusion equation (DE):

$$\frac{1}{v}\frac{\partial}{\partial t}\phi(r, t) - \nabla\cdot[D(r)\nabla\phi(r, t)] + \mu_a(r)\phi(r, t) = S(r, t). \quad \text{(Eq. 5)}$$

It has been found that the weak angular dependence assumption, Equation 3, can be invalid when $\mu_a$ is large relative to $\mu_s$ and near boundaries and sources. The time-invariant homogeneous Green's function solution to the DE is:

$$\phi(r) = \left(\frac{s_0}{4\pi D}\right)\frac{\exp\left(-\sqrt{\frac{\mu_a}{D}}|r-r_s|\right)}{|r-r_s|}, \quad \text{(Eq. 6)}$$

where $r_s$ is the location of a point isotropic source with power $S_0$(J). Solving for J using Equation 4 gives:

$$J(r) = \left[\frac{S_0(r-r_s)}{4\pi}\right]\left(\frac{\sqrt{\frac{\mu_a}{D}}}{|r-r_s|^2} + \frac{1}{|r-r_s|^3}\right)\exp\left(-\sqrt{\frac{\mu_a}{D}}|r-r_s|\right). \quad \text{(Eq. 7)}$$

Within a homogeneous medium and assuming no temporal variation, Equation 1 can be written as:

$$\Omega\cdot\nabla L(r,\Omega)+(\mu_a+\mu_s)I(r,\Omega)=Q_s(r,\Omega), \quad \text{(Eq. 8)}$$

where the source is now the in-scattered light:

$$Q_s(r,\Omega)=\mu_s\int_{4\pi} d\Omega' f(\Omega'\rightarrow\Omega)L(r,\Omega'), \quad \text{(Eq. 9)}$$

or the light that is scattered from incident directions, Ω', into the direction of interest, Ω.

A solution to Equation 8 can be found integrating over the line of sight defined by distance R, using the geometry illustrated in FIG. 1. Within a homogeneous medium and assuming no temporal variation:

$$L(r,\Omega)=\mu_s\int_0^{\infty} dR\ \exp[-(\mu_s+\mu_a)R]\int_{4\pi} d\Omega' f(\Omega'\rightarrow\Omega)I(r-R\Omega,\Omega'). \quad \text{(Eq. 10)}$$

Consider Ω as being directed towards a detector or pixel in fog and a small detector area such that the measured photocurrent is proportional to I. Deciphering Equation 10, in-scattered light at positions r−RΩ directed towards the detector along the line of sight is attenuated and integrated at the detector. Assuming isotropic scatter, i.e., $f(\Omega'\rightarrow\Omega)=\frac{1}{4}\pi$, one arrives at:

$$I(r, \Omega) = \frac{\mu_s}{4\pi}\int_0^{\infty} dR\exp[-(\mu_s+\mu_a)R]\phi(r-R\Omega). \quad \text{(Eq. 11)}$$

Alternatively, one can use the weak angular dependence approximation from Equation 3. With sufficient scatter such that $f(\Omega'\rightarrow\Omega)$ depends only on the scattering angle, one finds:

$$\int_{4\pi} d\Omega' f(\Omega'\rightarrow\Omega)=1, \quad \text{(Eq. 12)}$$

$$\int_{4\pi} d\Omega' f(\Omega'\rightarrow\Omega)=g\Omega. \quad \text{(Eq. 13)}$$

Then, by substituting Equation 3 into Equation 10 and using Equations 12 and 13, one finds:

$$I(r, \Omega) = \frac{\mu_s}{4\pi}\int_0^{\infty} dR\exp[-(\mu_s+\mu_a)R][\phi(r-R\Omega)+3gJ(r-R\Omega)\cdot\Omega]. \quad \text{(Eq. 14)}$$

Equation 14 is an approximate integral equation solution to the RTE that can be solved using the DE. Equation 14 contains an additional anisotropic term compared to Equation 11, and for the case of isotropic scatter (g=0), reduces to Equation 11. Combining Equation 14 with Equations 6 and 7 provides an analytic solution for the light incident on a detector within a homogeneous scattering media subject to the weak angular dependence approximation of Equation 3 to radiative transport. For convenience one can define:

$$L(r,\Omega)=\int_0^{\infty} dR L(r,\Omega,R), \quad \text{(Eq. 15)}$$

where L(r,Ω,R) is the contribution of the in-scattered light at a distance R to a detector at r.

Light Propagation in Fog (Model)

One may assume that the water droplets in fog are spherical, and the scattering and absorption processes are described by Mie theory such that $\mu_s$, g, and $\mu_a$ can be calculated from the particle size distribution and particle density, as follows. Mie's solution to Maxwell's equations describes the scattering of a plane wave in a homogeneous medium by a sphere of known diameter and refractive index (RI). In fog, the spheres will have a distribution of diameters, $d_i$, where i denotes a parameter of the ith sphere. Assuming the spheres are far apart, one can write the macroscopic parameters in terms of the microscopic ones:

$$\mu_s=N\Sigma_i\sigma_{s_i}n_i \quad \text{(Eq. 16)}$$

$$\mu_a=N\Sigma_i\sigma_{a_i}n_i \quad \text{(Eq. 17)}$$

$$\mu'_s=N\Sigma_i(\sigma_{s_i}n_i)(1-g_i), \quad \text{(Eq. 18)}$$

where N is the particle density (cm$^{-3}$), $n_i$ is the fraction of N contributed by particles of diameter $d_i$, and $\sigma_{s_i}$ and $\sigma_{a_i}$ are the scattering and absorption cross-sections. Experimentally, N and $n_i$ can be determined from transmissometer and particle sizer measurements. The averaged anisotropy g can be computed as $g=1-\mu'_s/\mu_s$.

Simulating Equations 16, 17, and 18 using the refractive index (RI) and particle size distribution illustrated in FIGS.

Figure 3A:
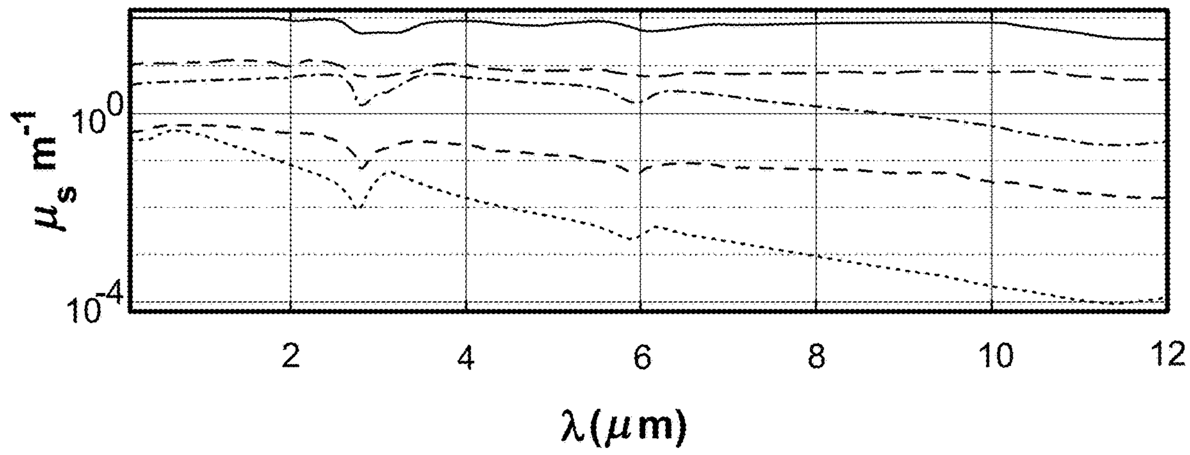
FIGS. 3A-3C illustrate the scattering coefficient, the anisotropy, and the absorption coefficient calculated using a model in accordance with one or more embodiments of the present invention.
Figure 3B:
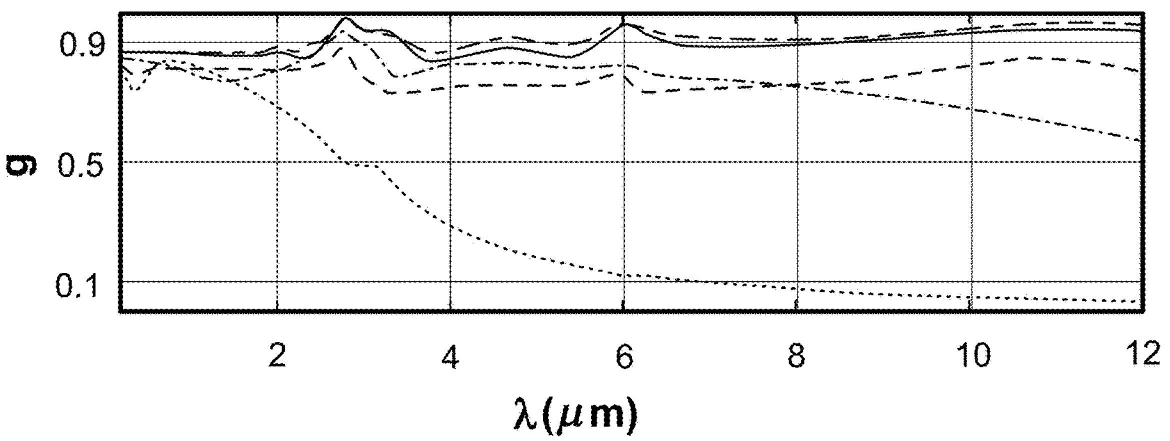
Figure 3C:
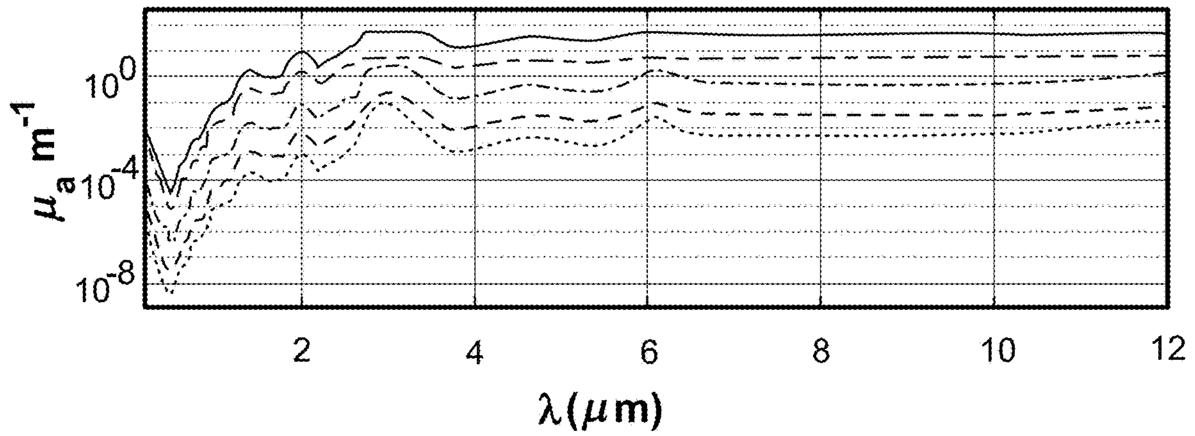

2A and 2B, respectively, yields the results illustrated in FIGS. 3A-3C. The size distributions were taken from the MODTRAN software (see, A. Berk et al., "MODTRAN®6: A major upgrade of the MODTRAN® radiative transfer code," Proceedings of SPIE, vol. 9088, art. no. 90880H (2014), the contents of which are incorporated herein by reference), measured at the Sandia National Laboratory Fog Chamber (SNLFC) (see, J. D. van der Laan et al., "Superior signal persistence of circularly polarized light in polydisperse, real-world fog environments," Applied Optics, vol. 57, no. 19, pp. 5464-5473 (2018), the contents of which are incorporated herein by reference), or measured by Garland (see, J. Garland, "Some fog droplet size distributions obtained by an impaction method," Quarterly Journal of the Royal Meteorological Society, vol. 97, pp. 483-494 (1971), the contents of which are incorporated herein by reference), and represent a diverse set of possible fog conditions.

Fog can form when the relative humidity nears 100% and sufficient condensation particles are present. The production rate of particles of diameter $d_i$ depends on the competition between condensation growth and the scavenging by larger pre-existing particles. The thermodynamics of the droplet formation can be described by Köhler theory, which allows prediction of $d_i$ as a function of concentration of dissolved solute under conditions of supersaturation. Fog is often generalized into two broad types based on the generation mechanics: radiation and advection. Radiation fogs typically form above ground that is cooled by thermal radiation, and advection fogs typically form near the coast when air masses with different temperatures and/or humidities mix and are often bimodal. Radiation fogs commonly consist of smaller particles than advection fogs. From FIG. 2B, the SNLFC is capable of producing both advection and radiation-like fogs (SNLFC 1 and 2, respectively). The SNLFC 2 distribution is typical for the fog employed in the Light Propagation in Fog (Experimental) section below.

Figure 2A:
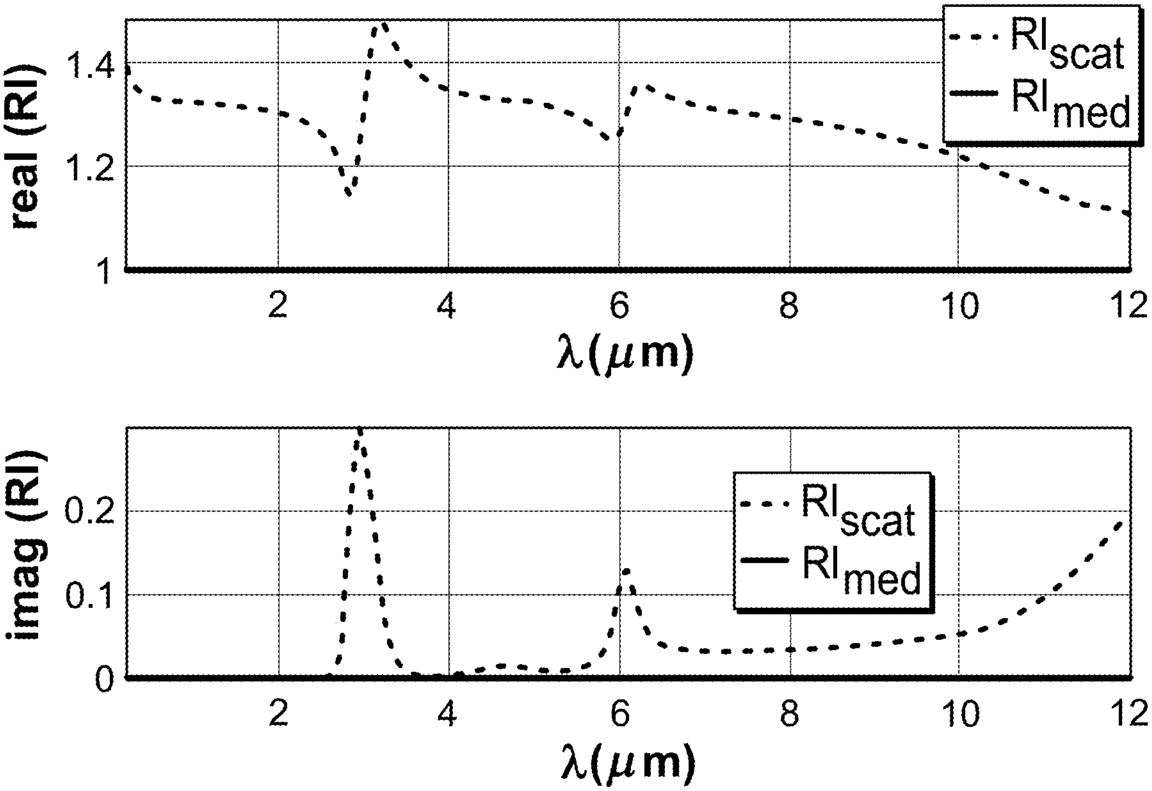
FIGS. 2A and 2B illustrate the refractive index and particle diameter distributions, respectively, for a simulation using a model in accordance with one or more embodiments of the present invention.
Figure 2B:
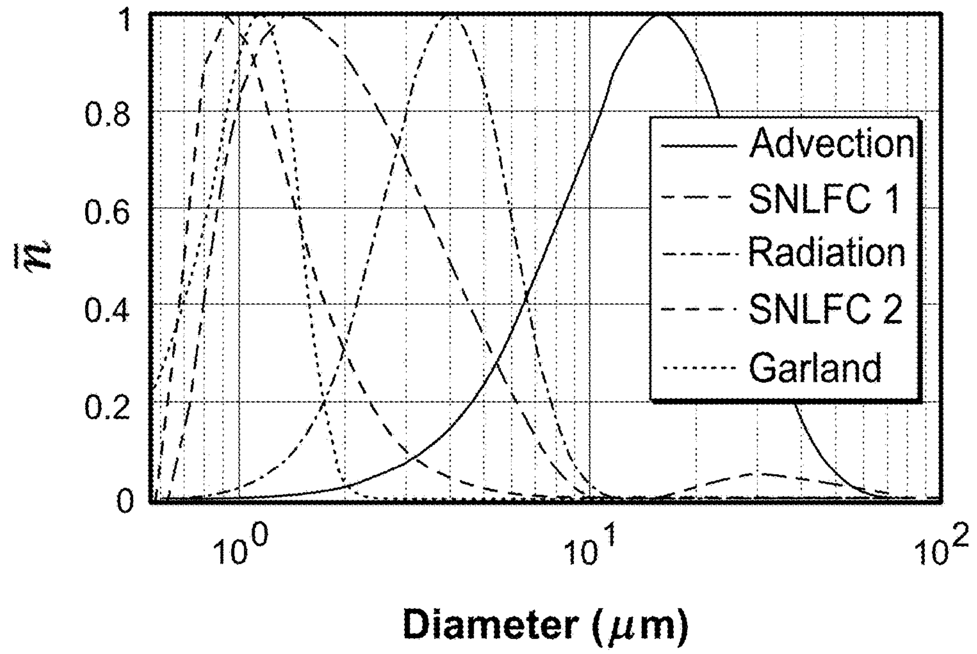

Considering FIGS. 3A-3C, which assume a constant particle density of $N=10^5$ cm$^{-3}$, the fog scattering properties can vary significantly depending on the size distribution. (Note that the legend in FIG. 2B also applies to FIGS. 3A-3C.) In general, as the wavelength, $\lambda$, is increased, the amount of scattering decreases, the light becomes less forward scattered, and the amount of absorption increases. When larger particles are present, there is less decrease in scattering at longer wavelengths and the extinction ($\mu_s+\mu_a$) can be lower in the visible than in the infrared. The scatter is not isotropic at any of the wavelengths considered, thus motivating use of Equation 14 instead of Equation 11. However, considering the Garland distribution, when almost all the particles are much smaller than the wavelength, the scatter becomes nearly isotropic. Peaks in absorption and dips in scatter corresponding to the resonances in FIG. 2A are observed around 2.95 μm and 6.1 μm. There are two bands where $\mu_s>\mu_a$ and the diffusion approximation used to derive Equation 5 could be expected to apply for fog. The first is at wavelengths between 200 nm and 2.7 μm, and the second is at wavelengths between 3.4 μm and 5.6 μm. Equations 6 and 7 may not be valid when calculating Equation 14 outside of these wavelength ranges unless larger particles are present.

Another optical parameter of interest for fog is the meteorological optical range (MOR), an approximation for human visibility, defined as "the length of path in the atmosphere required to reduce the luminous flux in a collimated beam from an incandescent lamp, at a color temperature of 2700 K, to 5 percent of its original value, the luminous flux being evaluated by means of the photometric luminosity function of the International Commission on Illumination." Fog is generally regarded as having a MOR of less than 1 km. A roughly equivalent expression derived from Beer's law for a single wavelength instead of a broadband source is often used:

$$MOR = -\frac{\ln(0.05)}{\mu_S + \mu_a}. \quad \text{(Eq. 19)}$$

One can provide a more physical basis for the MOR by relating it to $l_t$. The $l_t$ can be considered as the mean distance that collimated light will propagate in a scattering medium before becoming effectively isotropic, and therefore could provide a definition of visibility. When $\mu_a$ is negligible, as is essentially the case at visible wavelengths in fog, $$MOR=-\ln(0.05)(1-g)l_t. \quad \text{(Eq. 20)}$$

Averaging Equation 20 over visible wavelengths, one finds that $MOR\approx0.6\times l_t$ and that they are about equal when MOR is defined as 1% transmission instead of 5%, suggesting that MOR is a qualitative representation of $l_t$.

Figure 4A:
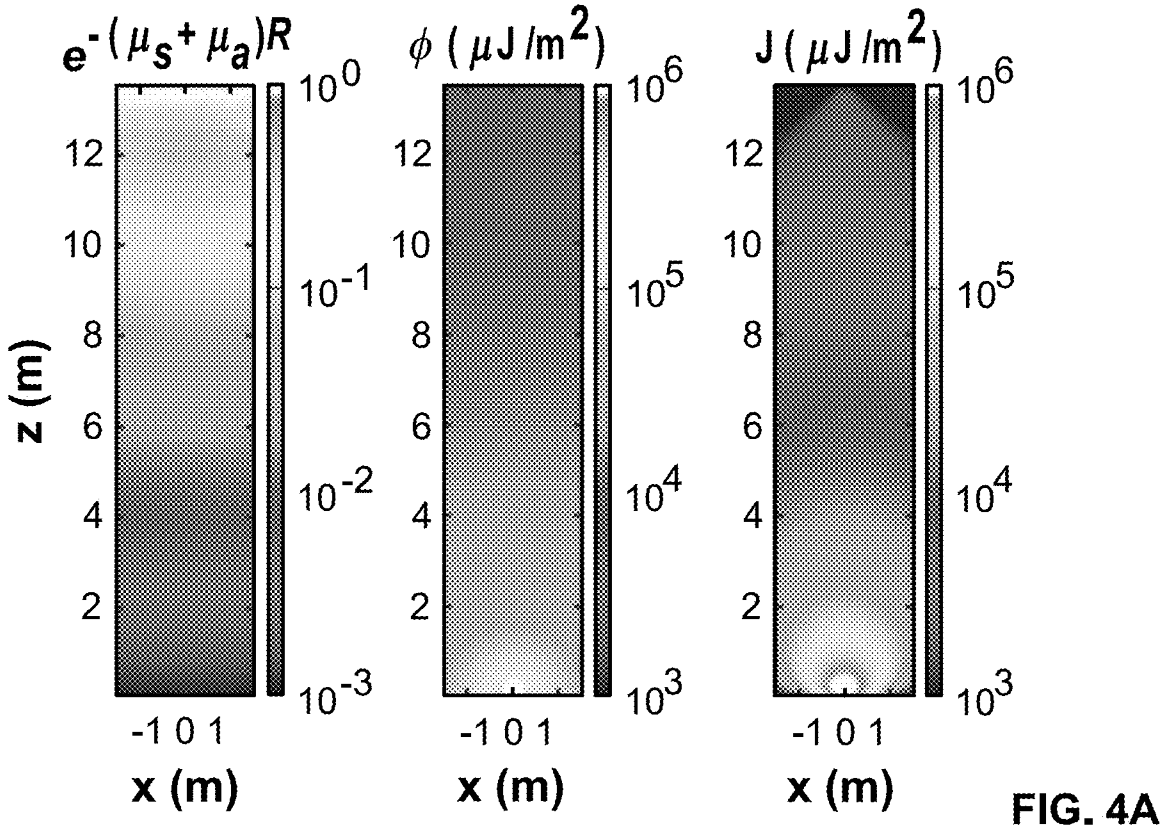
Figure 4B:
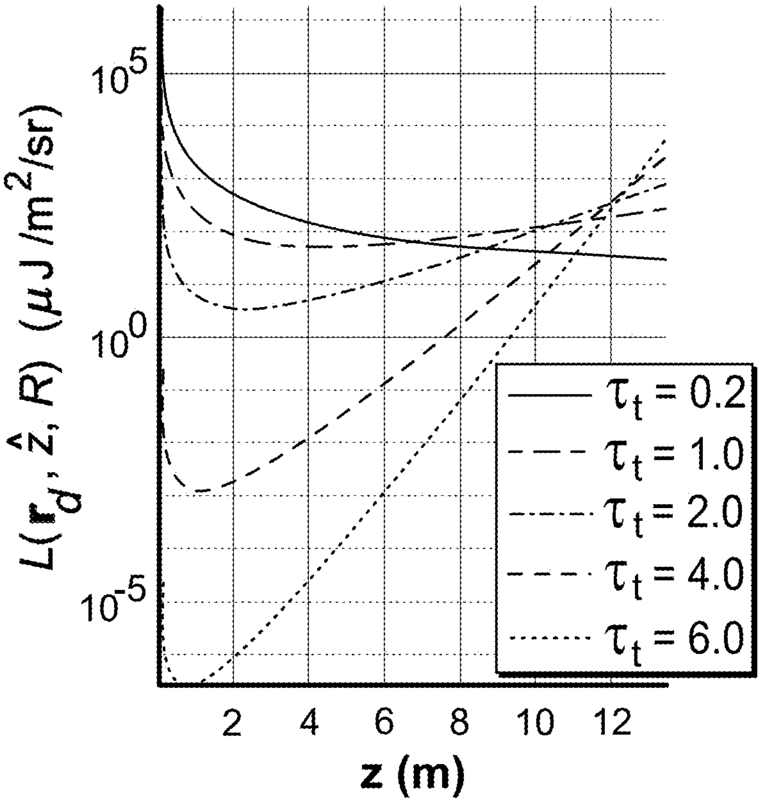
FIG. 4B illustrates the corresponding in-scattered light contribution.

One can use the fog optical properties illustrated in FIGS. 3A-3C that are relevant to the experiment discussed below to simulate the analytical solutions that are illustrated in FIGS. 4A and 4B. A 450 nm isotropic source is located at $r_s=(x,y,z)=(0,0,0)$ m with $S_0=4$ J. A single detector is located at $r_d=(0,0,13.5)$ m, and the simulation domain was discretized uniformly at 1 cm. The effect of extinction ($R=|r_d-r|$), fluence rate from Equation 6, and flux density from Equation 7 are plotted in FIG. 4A. These three plots assume a fog density of $10^5$ cm$^{-3}$, yielding from FIGS. 3A-3C, $\mu_s=0.33$ m$^{-1}$, $g=0.8$, and $\mu_a=6.6\times10^{-9}$ m$^{-1}$. These three components make up the in-scattered light contribution, $L(r_d,Q,R)$, according to Equation 14, as illustrated in FIG. 4B.

FIG. 4B illustrates $L(r_d,z,R)$ along the optical axis between the source and detector for different fog densities N relevant to the experiment discussed below. The radiance $L(r_d, z)$ is the integral of $L(r_d,z,R)$ along the z axis. This can be considered a measurement by a small detector with a tiny aperture that rejects photons that are not incident along the z axis. Interestingly, the positions that contribute the most light to the measurement change as the density is increased. At low density, i.e., $\tau_t<1$, positions near the source at z=0 m dominate the contribution. This is known as the shower curtain effect (SCE), and the source profile is transmitted through the scattering media with little distortion. Under these conditions, the fog near the detector acts like a neutral density filter. When $1<\tau_t<2$, positions near the source and near the detector at z=13.5 m both contribute equally. This is a transition regime where ballistic imaging becomes difficult, the small angle approximation (SAA) is no longer valid, and the SCE is minimal. Furthermore, an aperture in the Fourier plane of an imaging system used to reject scattered light becomes ineffective at improving image quality. At high density, i.e., $\tau_t>2$, mostly positions near the detector contribute. For high density, as would be the case in biological tissue (density $\mp10^9$ cm$^{-3}$), the integration along R in Equation 14 need not be computed, and the radiance at the detector is given by just Equations 3, 6, and 7. For low density and when the source-detector distance is less than the transport mean free path (in the simulation, $l_t=14.3$ m when $N=10^5$ cm$^{-3}$), Equation 14 provides a sufficient description of the radiance incident on the detector, as shown through comparison with the experiments described below. The computational time needed to generate all the plots in FIG. 4 was negligible.

Figure 5:
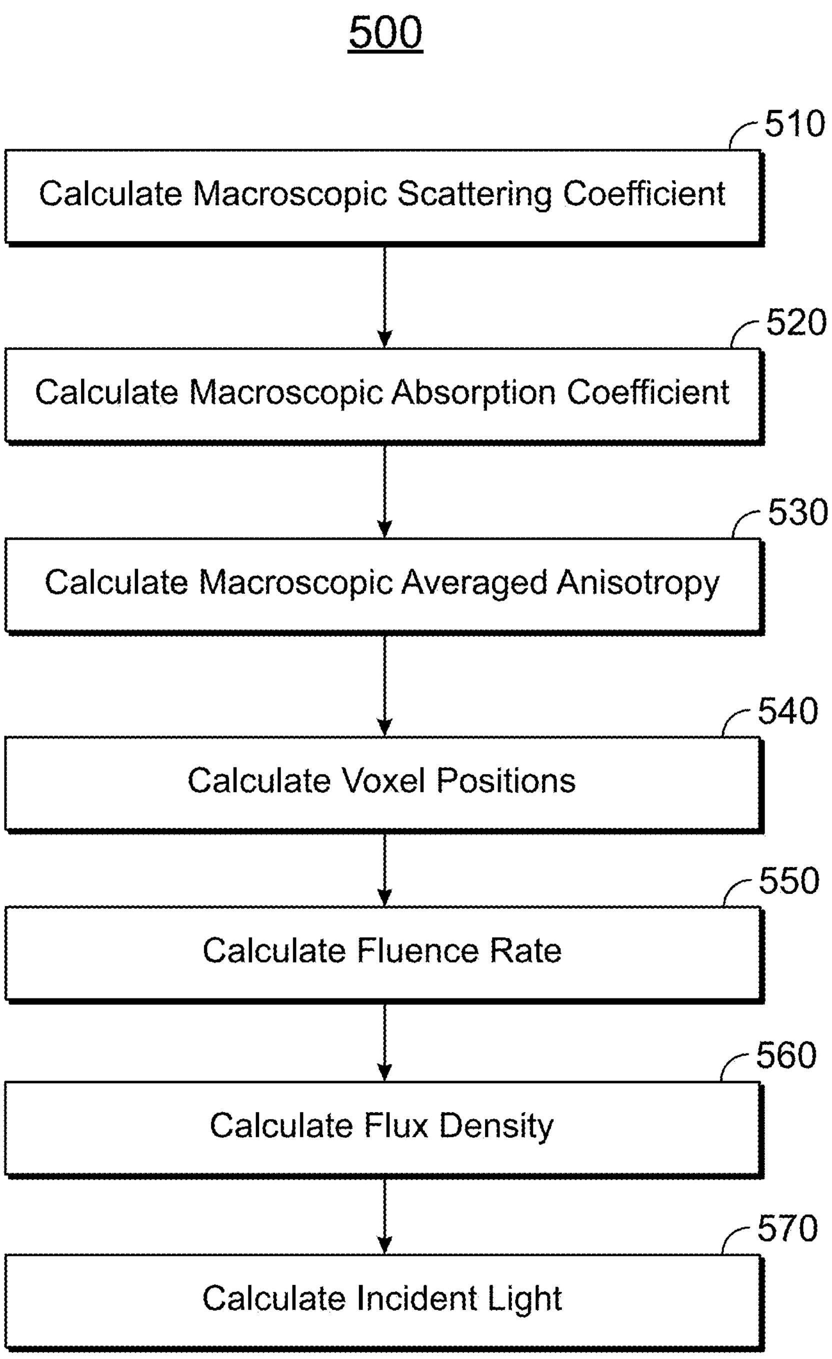
FIG. 5 illustrates a flowchart of the process whereby light transport from an object to a detector is calculated in accordance with one or more embodiments of the present invention.

FIG. 5 illustrates a flow chart of the overall light propagation modeling process 500. In step 510, the macroscopic scattering coefficient $\mu_s$ is calculated based upon Equation 16. In step 520, the macroscopic absorption coefficient $\mu_a$ is calculated based upon Equation 17. In step 530, the macroscopic averaged anisotropy g is calculated as $g=1-\mu'_s/\mu_s$ based upon Equation 18. In step 540, the voxel positions in (x,y,z) space are calculated based upon the magnification of the detector's imaging optics in accordance with Equations 21 and Ω. In step 550, the fluence rate $\phi(r)$ is calculated based upon Equation 6, employing the macroscopic scattering coefficient $\mu_s$ (calculated in step 510), the macroscopic absorption coefficient $\mu_a$ (calculated in step 520), the macroscopic averaged anisotropy g (calculated in step 530), and the source position (calculated in step 540). In step 560, the flux density J(r) is calculated based upon Equation 7, employing the calculated macroscopic scattering coefficient $\mu_s$, the macroscopic absorption coefficient $\mu_a$, the macroscopic averaged anisotropy g, the source position, and the fluence rate (calculated in step 550). In step 570, the radiance at the detector L(r,Ω) is calculated based upon Equation 10.

Light Propagation in Fog (Experimental)

Solving Equation 14 requires that the line of sight −RΩ for the detector is known. For a camera in fog, the line of sight of each pixel is defined by the imaging optics associated with the detector in the camera. One can use the magnification principle to determine the positions of voxels in (x,y,z) space that make up the line of sight of a pixel in (x'y',z') space according to:

$$x' = \frac{-d_I}{d_O - z}x = -Mx \quad \text{(Eq. 21)}$$

$$y' = \frac{-d_I}{d_O - z}y = -My, \quad \text{(Eq. 22)}$$

where $d_I$ is the distance from the lens to the pixel array, $d_O$ is the distance from the lens to the furthest point within the volume of interest, and M is the magnification of the lens. Intuitively, the pixel array is projected outwards from the camera location to determine the (x,y,z) locations at which $L(r_d,\Omega,R)$ must be computed. Assuming that each pixel and its corresponding solid angle are sufficiently small such that the measured photocurrent is proportional to $(r_d, \Omega)$. Using imaging optics with M=1 would simplify the problem, however, this limits the remote sensing applications. The lines of sight could also be found experimentally using calibration methods.

To validate the models described above, an experiment was performed at the SNLFC. Briefly, a saltwater solution (1% salt, which does not significantly change water's refractive index) is periodically sprayed from 64 nozzles uniformly distributed along the length of a fog chamber. A particle sizer and a three-band transmissometer provide the particle size distribution ($n_i$) and the particle density (N). A schematic illustrating the experimental setup is presented in FIG. 6A. The dimensions of the chamber are about 3×3×55 m. A three-band transmissometer with lock-in amplifiers enabled the ballistic transmission T to be determined over a large dynamic range and at a desired wavelength using Mie theory as only the 9.68 μm light was detectable at maximum N. A data set measured during a single spray cycle lasting about 50 minutes is illustrated in FIGS. 6B, 6C, and 6D. Throughout, the spray cycle data was captured continuously by a visible CMOS camera and the particle sizer and transmissometer, allowing camera images to be matched to the corresponding fog optical parameters $\mu_s$, g, and $\mu_a$ using Equations 16, 17, and 18. The camera was focused at infinity with a 5 cm effective focal length and F-stop of F/6.3, giving a full acceptance angle of about 9°. The light source was a 450 nm, 2 W mounted LED directed towards the camera. The distance between the LED and the camera was 13.5 m, nearly equivalent to the transmissometer distance, which may help account for any spatial variations in fog density N within the fog chamber.

The saltwater spray began at about 1 minute and ended at about 23 minutes. As illustrated in FIG. 6B, the fog density N rapidly increased after the spray began and then leveled off. After the spray was complete, there was a rapid decrease in N followed by a density spike at about 30 minutes and then a gradual decrease.

FIG. 6D illustrates a plot of $l_t$ and MOR to suggest human visibility limits and provide an intuitive sense of the high N achievable by the fog chamber. Near the maximum density of the fog chamber, the MOR is <2 m. FIG. 6D illustrates that $l_t$ is approximately related to MOR (at 450 nm) according to Equation 20.

Light Propagation Model Validation

The experimental measurements are compared to the model predictions. First, equations 21 and Ω were used with $d_I$=5 cm and $d_O$=13.5 m to determine the line of sight of each camera pixel. The free-space projection of the pixel positions (x',y',z') into (x,y,z) space was tested using images of a resolution target at multiple positions, and the feature size error was found to be less than 5%. Equations 6 and 7 assume an isotropic source, however, the LED had a Lambertian profile. To simulate the LED source, the line of sight of each pixel was limited to extend only to the plane of the LED, as illustrate in FIG. 4A.

Figure 6A:
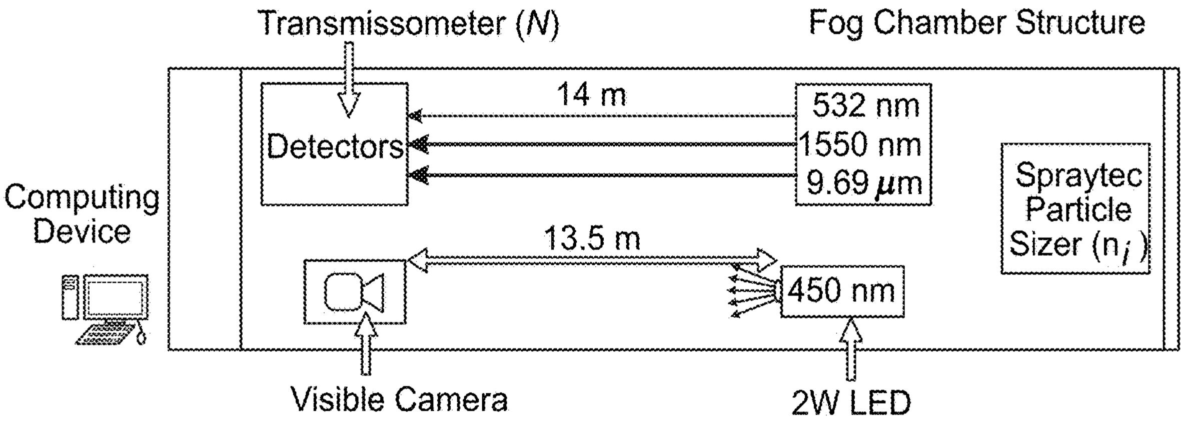
Figure 6B:
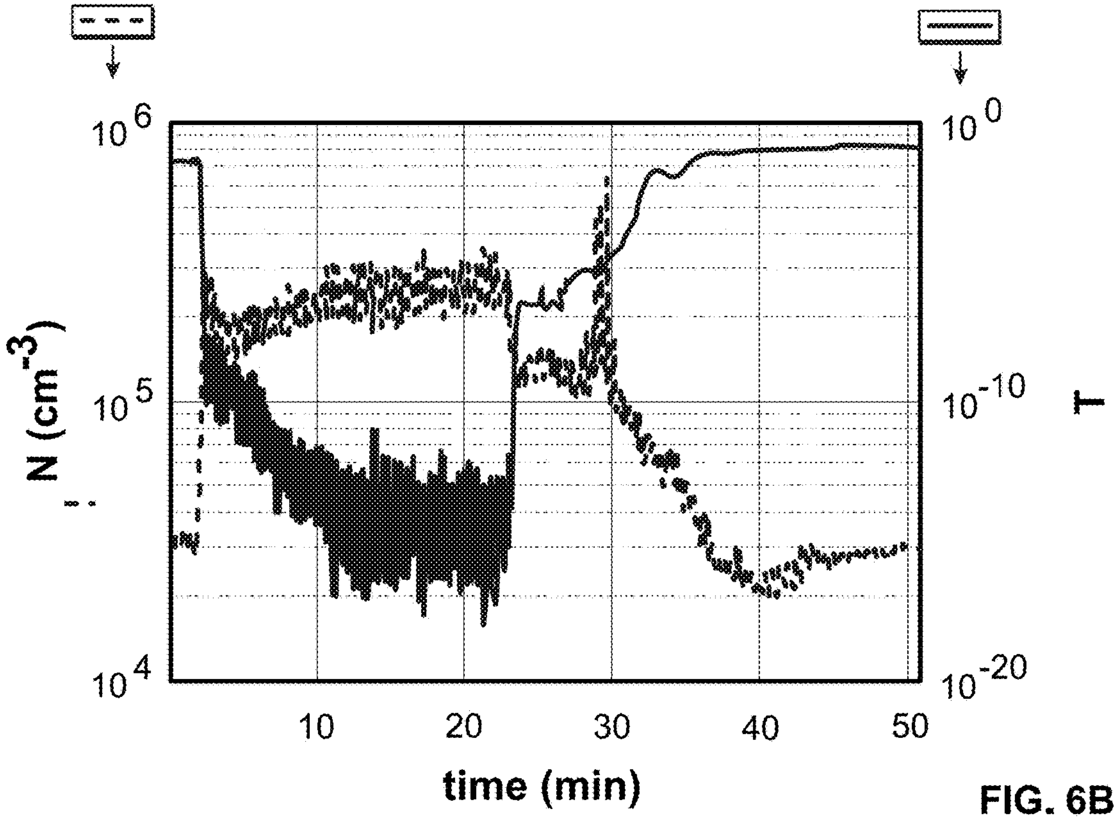
FIGS. 6B-6D illustrate the particle density and corresponding ballistic transmission, the particle diameter, and the transport mean free path length, respectively, as a function of time during the experiment.
Figure 6C:
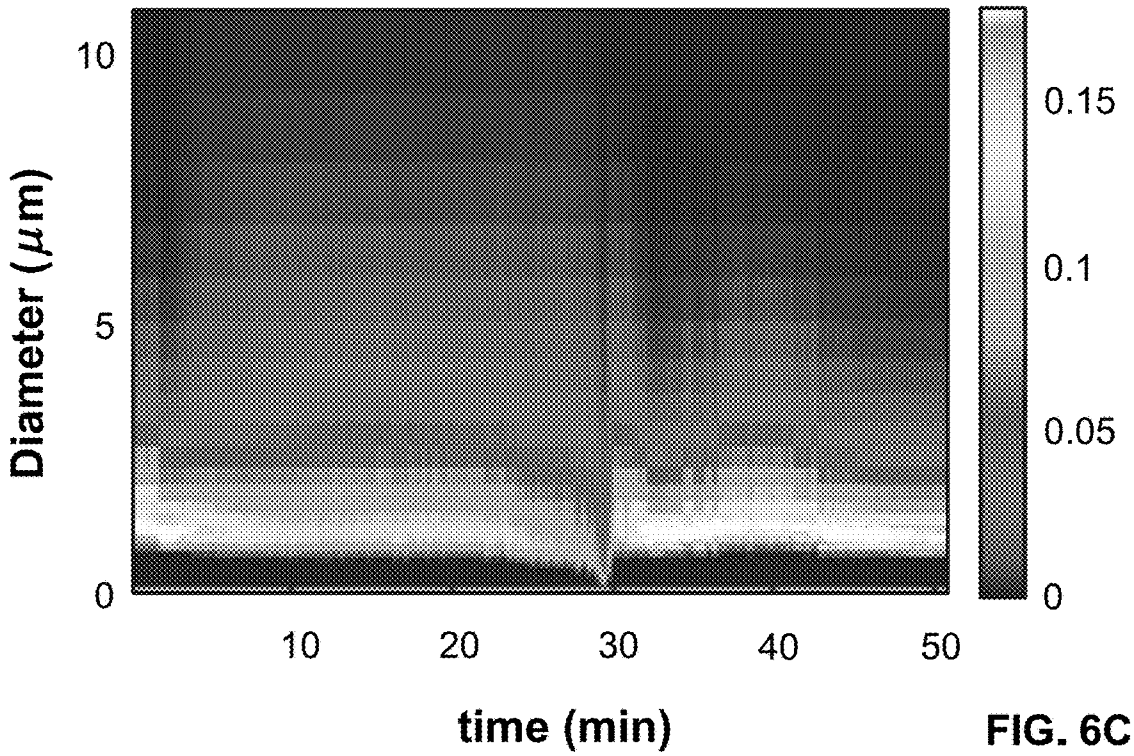
Figure 6D:
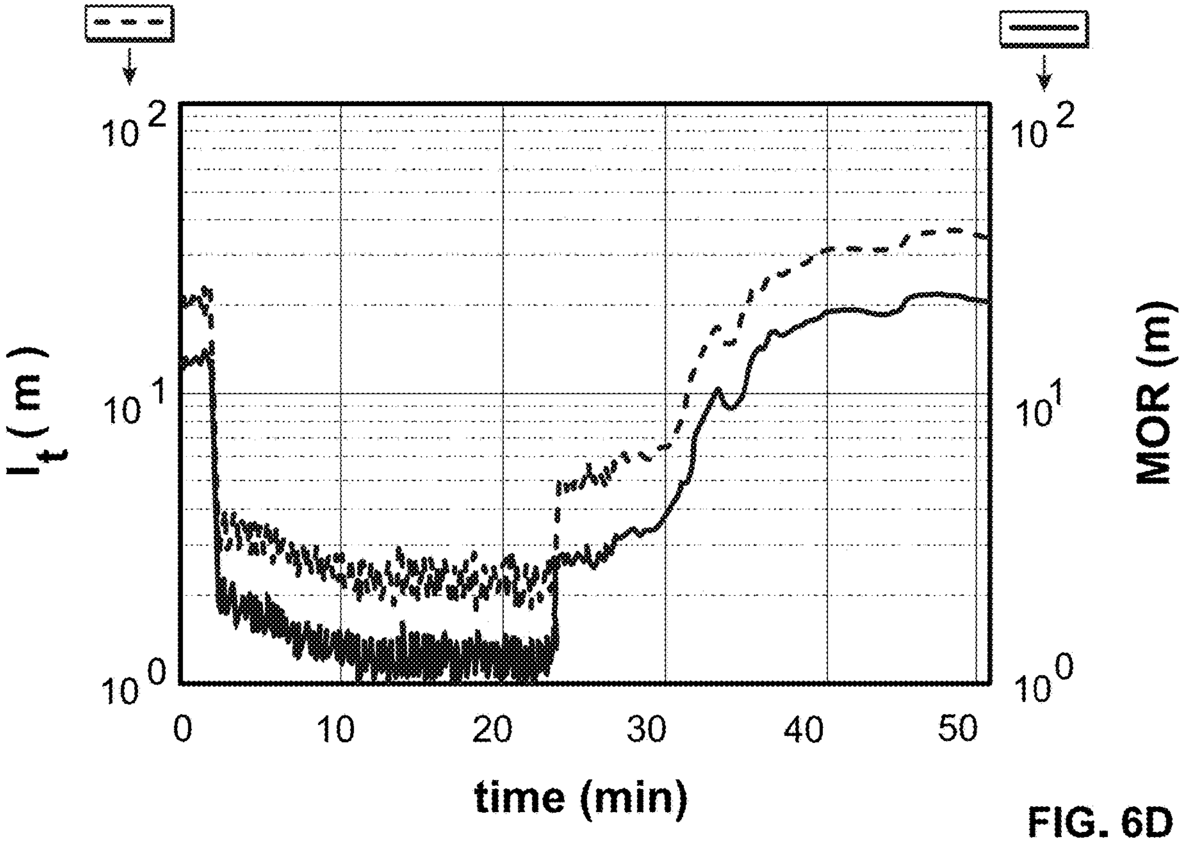
Figure 7:
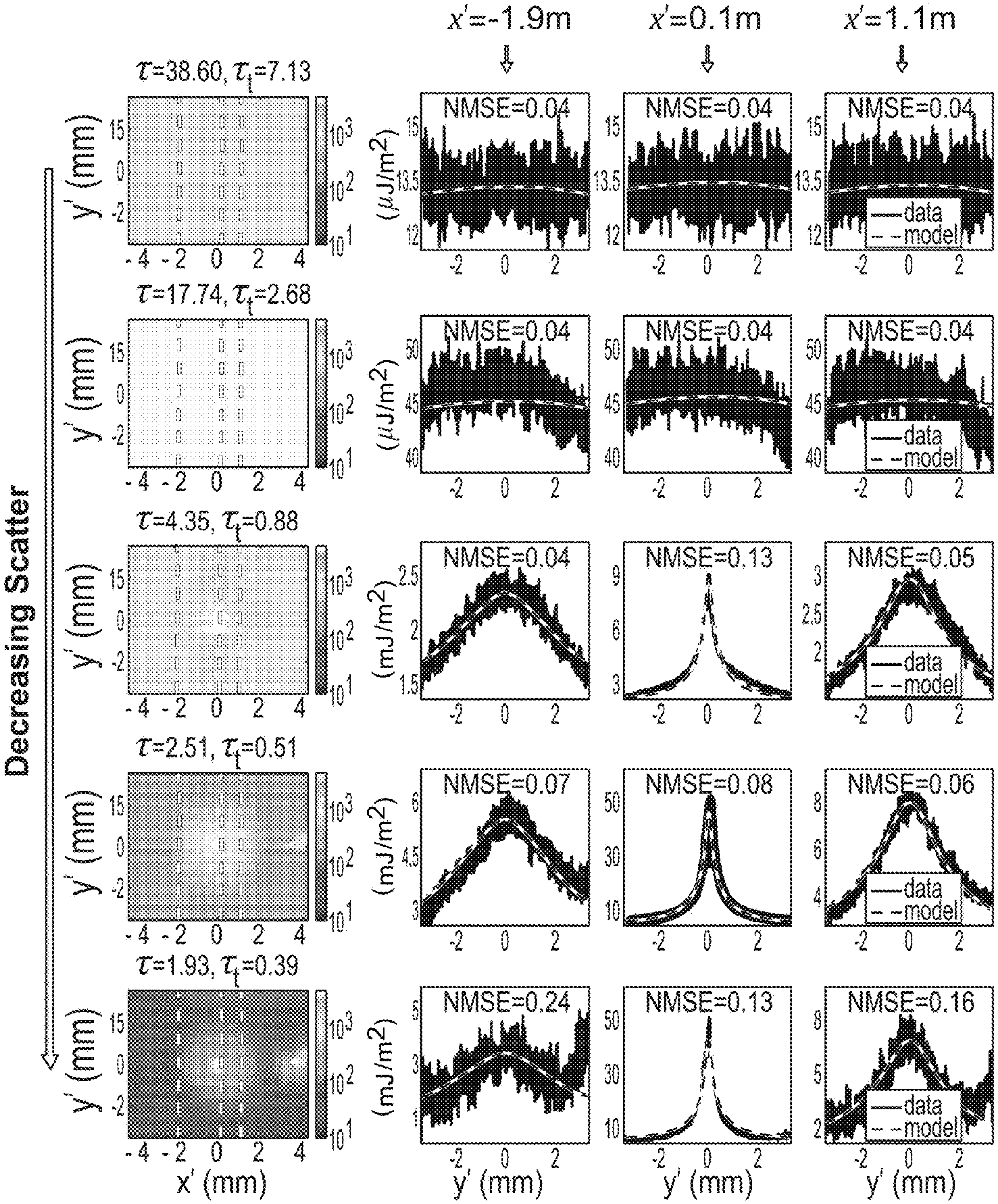
FIG. 7 illustrates the normalized mean square error of a model in accordance with one or more embodiments of the present invention relative to experimental data.

Images were captured using the experimental setup illustrated in FIG. 6A to compare to Equation 14. The fog optical parameters $\mu_s$, g, and $\mu_a$ were computed using Equations 16, 17, and 18 and the transmissometer and particle sizer data. Representative results are illustrated in FIG. 7. The fog parameters t and Tt are shown above the images in the left column. The plots to the right of each image compare measured data along the dashed white lines to the model predictions. The plots from left to right correspond to the dashed white lines from left to right, respectively. The image counts were first converted to photons using the detector quantum efficiency and pixel saturation capacity. The photons measured by each pixel were then converted to mJ/m$^2$ using the detector integration time (2 seconds) and the physical size of the pixel (3.45 μm). During the experiment the source power was decreased from 2 W at maximum fog density to about 5 mW at minimum fog density to avoid pixel saturation. To compare to the model, the image data was scaled such that a light source with constant $S_0$=4 J could be assumed for each measurement. The result of this procedure is that the peak power density in FIG. 7 increases with decreasing N. It was also necessary to scale the experimental data by a constant calibration factor close to 1. At low fog density, light scattered from the transmissometer is visible on the right in the images. The locations of the white dashed lines were chosen to minimize the effect of this scattered transmissometer light as well as the finite cross-section of the fog chamber. To compare the measured and modeled data, we calculate the normalized mean square error (NMSE):

$$NMSE = \left\{ \frac{\sum_{k=1}^{N} [P^{mod}(r'_k) - P^{exp}(r'_k)]^2}{\sum_{k=1}^{N} [P^{exp}(r'_k)]^2} \right\}^{1/2}, \quad \text{(Eq. 23)}$$

where k is an index from 1 to M of camera pixel locations $r'_k$, M is the number of camera pixels along a white dashed line in FIG. 7, $P^{mod}(r'_k)$ is the power density predicted by the model, and $P^{exp}(r'_k)$ is the experimentally measured value.

Given the assumptions made, the model provides a very good prediction of the measured data. The rows of FIG. 7 from top to bottom correspond to the times 19, 23, 32, 35, and 47 minutes in FIGS. 6B, 6C, and 6D, allowing the corresponding T, $n_i$, $l_t$, and MOR to be determined. Time points during the density spike were avoided. Considering the rows of FIG. 7 from top to bottom, N has decreased by about an order of magnitude causing the image spatial profile to change significantly, and this is captured by the model. At maximum density during the spray presented in the top row, only the highly scattered or diffuse glow with minimal spatial variation is measured. In the second row, there is a mismatch between the homogeneous fog model and experiment that is due to spatial variations within the fog caused by settling that occurs after the spray is complete and before the density spike. At the lower densities in the third, fourth, and fifth rows, $l_t$ is comparable to or about equal to the source-detector separation (13.5 m), and the in-scattered light near the source contributes to the peak in power density at the center of the image, as discussed above in the Light Propagation in Fog (Model) section. This peak in power density in the low scattering regime is not captured by the standard diffusion theory and requires Equation 14. Pixels further from the center of the image collect light that has been scattered more times than the pixels near the center of the image. The difference in t and $t_r$ between the bottom two rows is mostly due to different particle size distributions at those time points rather than different N.

Simulated Camera Measurements

The simulations presented in this section used the optical parameters of a fog generated at the SNLFC with a density of $10^5$ $cm^{-3}$ and the "SNLFC2" particle size distribution from B. Z. Bentz et al., "Light transport with weak angular dependence in fog," Optics Express, vol. 29, no. 9, pp. 13231-13245 (2021), the contents of which are incorporated herein by reference. This results in $\mu_s=0.5$ $m^{-1}$, $\mu_a=10^{-8}$ $m^{-1}$, and g=0.8 for 450 nm light, corresponding to a MOR of 6 m. The simulations further used an energy $S_0=4$ J and a pixel array at r corresponding to the Basler Ace acA2440 CMOS camera with a 2 second integration time.

Because an object can have optical properties that are different than the background, this results in an interface that reflects, scatters, and/or transmits light. The following considers the case of a spherical object with a diameter d, a reflection weight Γ, and an opacity weight κ, with the object located at $r_0=(x_0, y_0, z_0)$, corresponding to the position $r-R\hat{\Omega}$ as illustrated in FIG. 1. A forward model can then be written as:

$$f(x)=y_b+\kappa S(r_0,d)+\Gamma R(r_0,d), \quad \text{(Eq. 24)}$$

where $x=[r_0, d, \Gamma, \kappa]$ are the object parameters, f(x) is a vector of length P, where P is the number of pixels in the camera array, $y_b$ is the expected measurement in absence of an object, $S(r_0, d)$ is the light blocked by the object, and $R(r_0, d)$ is the light reflected by the object. The vector components of $y_b$, $S(r_0, d)$, and $R(r_0, d)$ are given, respectively, by:

$$y_{b_i} = \frac{\mu_s}{4\pi} \int_0^\infty dR_i \exp[-(\mu_s+\mu_a)R_i] \times [\varphi(r_d - R_i\hat{\Omega}_i) + 3g|J(r_d - R_i\hat{\Omega}_i)\cdot\hat{\Omega}_i|], \quad \text{(Eq. 25)}$$

$$S_i = -\frac{\mu_s}{4\pi} \int_{R_0}^\infty dR_i \exp[-(\mu_s+\mu_a)R_i] \times [\varphi(r_d - R_i\hat{\Omega}_i) + 3g|J(r_d - R_i\hat{\Omega}_i)\cdot\hat{\Omega}_i|], \text{ and} \quad \text{(Eq. 26)}$$

$$R_i=(r_o,-\hat{\Omega}_i)\exp[-(\mu_s+\mu_a)R_0], \quad \text{(Eq.27)}$$

where i is an index from 1 to P, $R_i$ and $\hat{\Omega}_i$ define the line of sight for the ith pixel, $I(r_0, -\hat{\Omega}_i)$ is computed using Equation (14), and $R_0$ is the distance from the pixel or camera to the object. To approximate the effects of specular and diffuse reflection at the object surface, the reflection weight Γ is used to relate the radiance in direction $-\hat{\Omega}$, towards the object ($I(r_0, -\hat{\Omega}_i)$ in Equation 27), to the radiance reflected into direction $\hat{\Omega}$, towards the detector, as illustrated in FIG. 1. While the reflection weight Γ is expected to be within the range of 0 to 1, it could be greater than 1 for other geometries, such as when there are multiple sources close to the object.

Figure 8A:
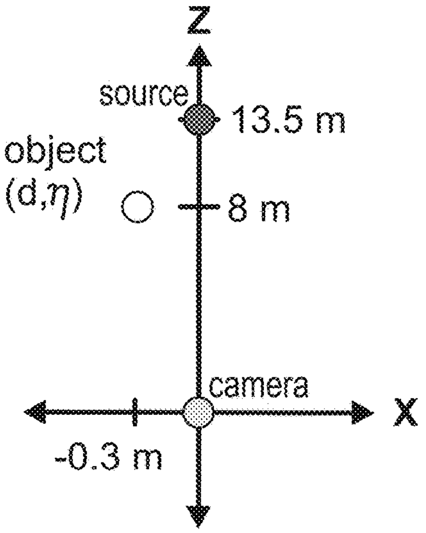
FIGS. 8A-8D illustrate the simulated solutions for both transmission geometry (FIGS. 8A-8B) and reflection geometry (FIGS. 8C-8D) of a model in accordance with one or more embodiments of the present invention.
Figure 8B:
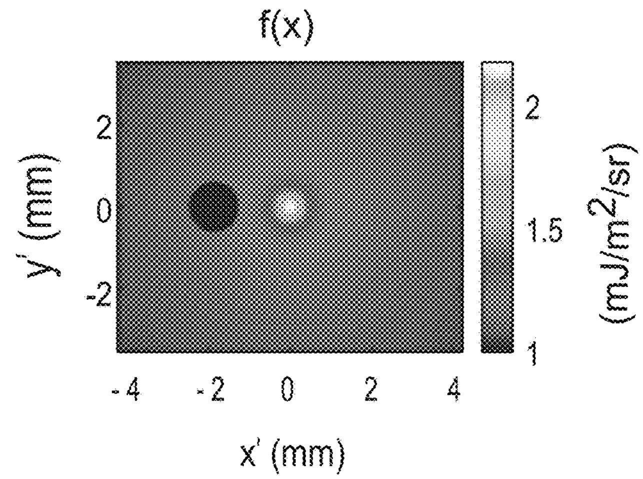
Figure 8C:
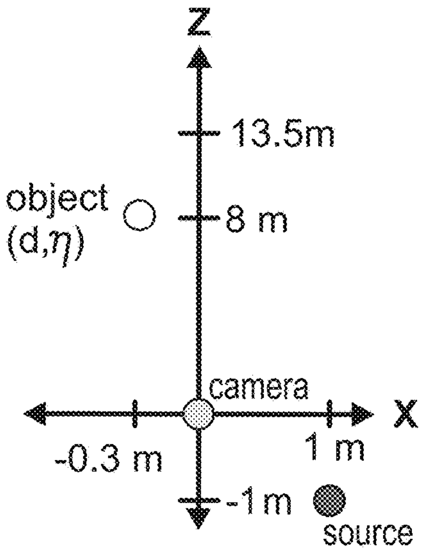
Figure 8D:
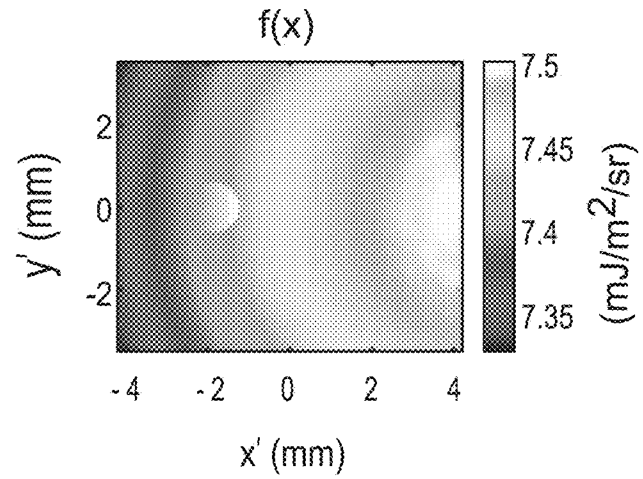
Figure 9:
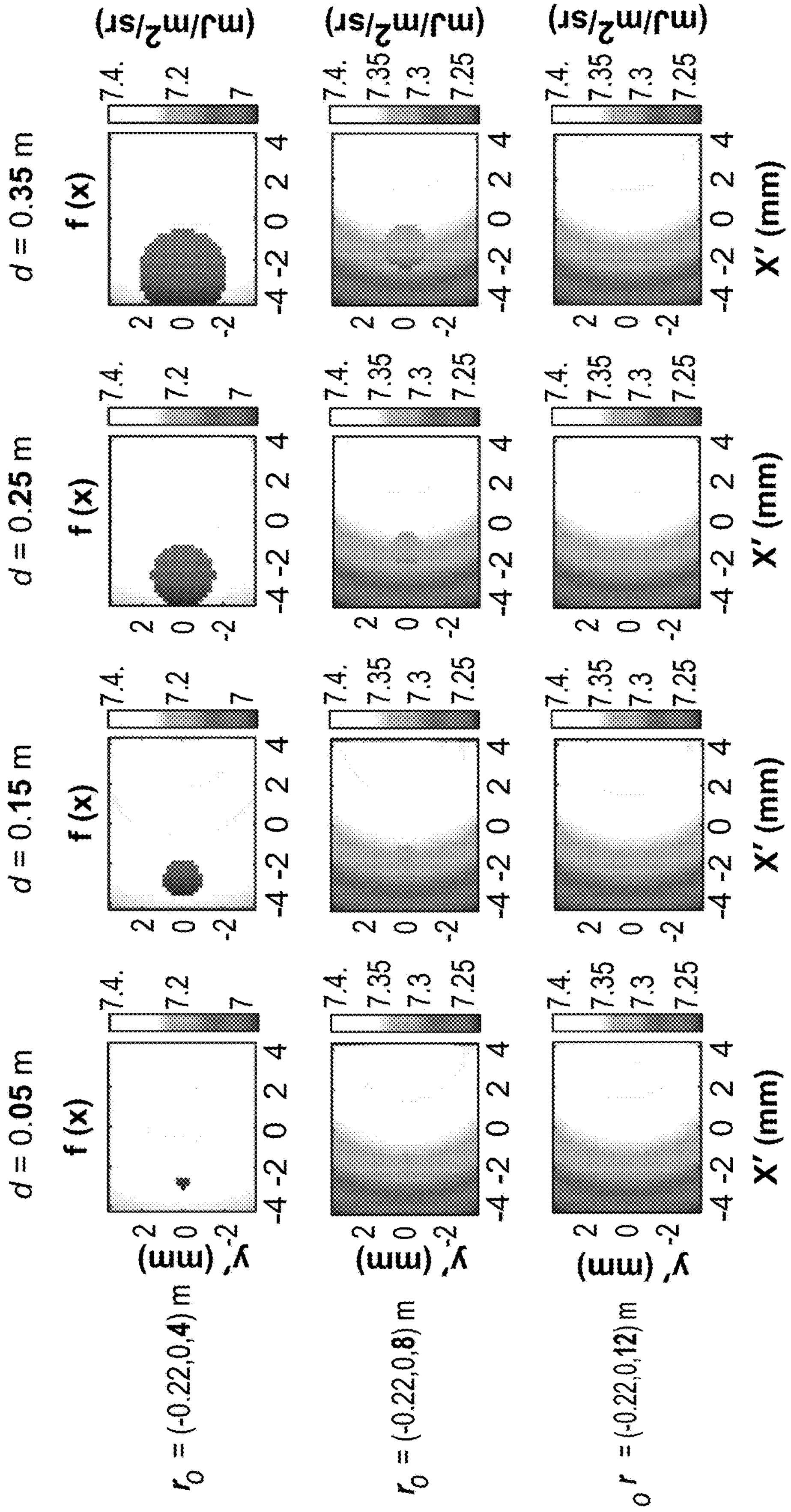
FIG. 9 illustrates simulated forward model solutions for the reflection geometry with different object positions and diameters of a model in accordance with one or more embodiments of the present invention.

FIGS. 8A-8D illustrate the simulated solutions for both a transmission geometry (FIGS. 8A-8B) and a reflection geometry (FIGS. 8C-8D). In both simulations, $r_0$ is (−0.22, 0, 8) m, Γ=0.9, and d=0.2 m. In the transmission configuration, $r_s$ is (0, 0, 13.5) m, while in the reflection configuration, $r_s$ is (1, 0, −1) m. Comparing f(x) in FIGS. 8B, 8D for the transmission and reflection cases, respectively, the contrast between the object and the background is much greater in the transmission geometry, suggesting the object is easier to detect. FIG. 9 illustrates simulated forward model solutions for the reflection geometry with different object positions and diameters. Each row in FIG. 9 corresponds to a different object position $r_0$, while each column corresponds to a different object diameter d. As illustrated in FIG. 9, when the object is close to the detector there is high contrast between the object and the background light, and when the object is moved farther away, the contrast decreases. When the object is 12 m away, there is essentially no contrast, implying the object is not detectable. This demonstrates the effect of back-scattered light interfering with a measurement. Initial comparison with experimental data suggests these model predictions are accurate, however, further verification is needed, especially for different fog types and densities.

Implementations and Variations

Figure 10:
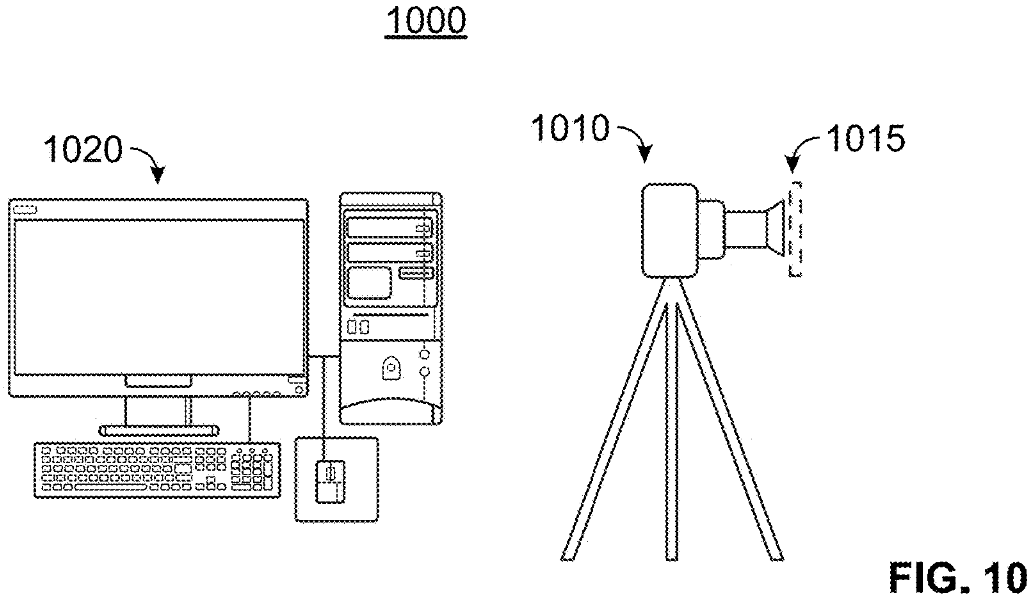
FIG. 10 illustrates a physical implementation of a system that may detect and calculate light transmission in accordance with one or more embodiments of the present invention.

At least one embodiment of the present invention may be implemented in the imaging system 1000 illustrated in FIG. 10. The imaging system 1000 includes a camera 1010 interfaced with a computing device 1020. As illustrated in FIGS. 3A, 3C, and 4B, the sensing wavelength, or wavelength range, of the camera 1010 should be carefully selected. In accordance with FIG. 3A, a longer sensing wavelength or wavelength range results in a reduced scattering coefficient $\mu_s$ for a given particle density N, suggesting that a longer sensing wavelength or wavelength range is preferable. In contrast, in accordance with FIG. 3C, a longer sensing wavelength or wavelength range results in an increased absorption coefficient $\mu_a$ for a given particle density N, suggesting that a shorter sensing wavelength or wavelength range is preferable, at least for sensing wavelengths less than about 3 μm. Based on FIG. 4B, the in-scattered light $L(r_d,\Omega,R)$ is a strong function of both particle density and wavelength, making selection of a sensing wavelength or wavelength range application specific. For example, if the application will typically be sensing in a low-density fog, then longer sensing wavelengths may be slightly preferred, while shorter sensing wavelengths may be strongly preferred for higher density scenarios.

As will be appreciated by those of skill in the art, if the camera 1010 operates at longer sensing wavelengths, the complexity and cost of the camera will generally increase. This is especially true if the camera 1010 operates in the long wavelength infrared (LWIR) range of 8-12 μm, where cooling of the camera is typically required to reduce thermal noise.

Given the strong wavelength dependence of various parameters, at least some embodiments of the present invention may optionally employ a narrow bandpass filter 1015 as part of the camera 1010. By limiting the sensing wavelength of the camera 1010 using a narrow bandpass filter 1015, various parameters may be approximated as constants, with the approximation becoming more exact as the bandpass width of the bandpass filter 1015 decreases. As will be appreciated by those of skill in the art, the use of a narrow bandpass filter 1015 will also reduce the signal magnitude from the camera 1010, which may impact the sensing distance of the imaging system 1000.

The largest single factor in selecting the sensing wavelength or wavelength range is the wavelength of the light being emitted by a potential source. If one seeks to detect a human in an outdoor environment during all times of the day and night, the preferred sensing wavelength range may be in the LWIR as this corresponds to the peak radiation wavelength range for a blackbody at a temperature of approximately 37° C. In contrast, if one seeks to detect a beacon operating at a known wavelength, for example 450 nm as in the above described experiment, then the sensing wavelength should be selected accordingly.

Figure 11:
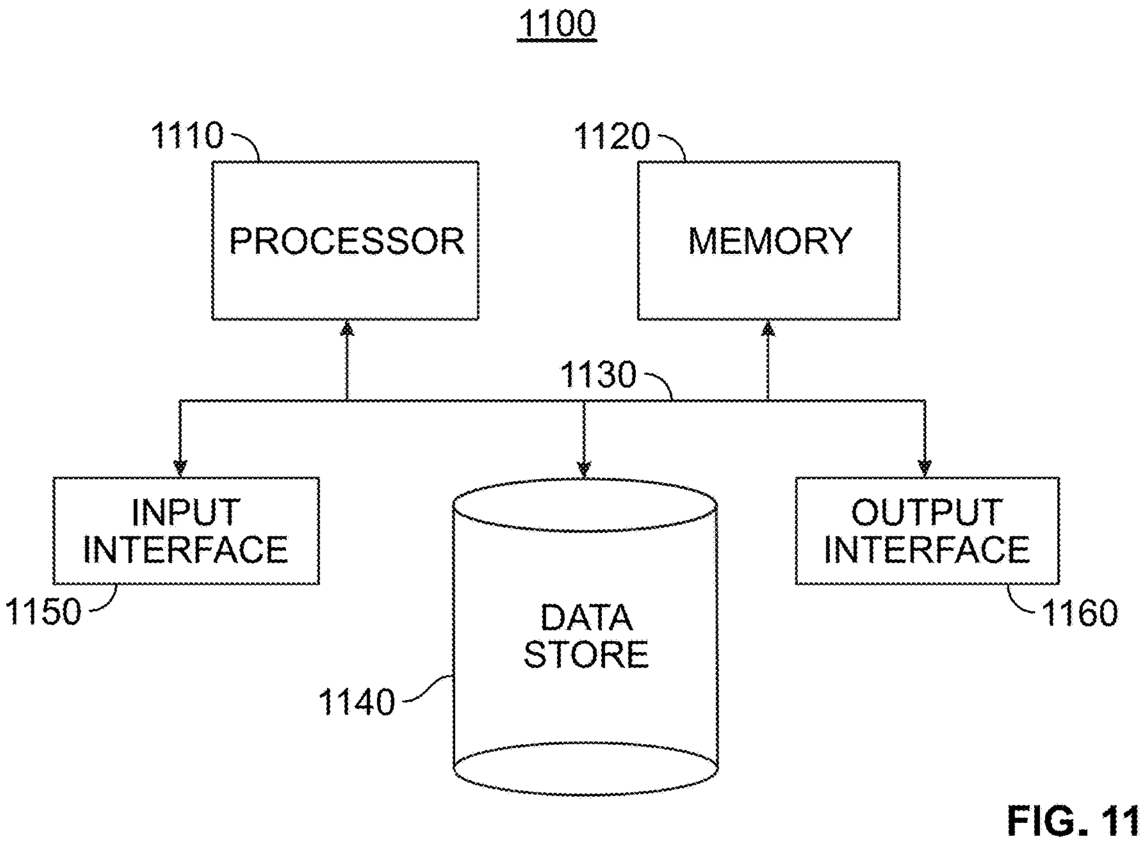
FIG. 11 illustrates a computing device that may be used to calculate light transmission in accordance with one or more embodiments of the present invention.

FIG. 11 is a high-level illustration of a computing device 1100 that can be used in accordance with one or more embodiments of the present invention. For example, the computing device 1100 may be used in a system that computes light transmission. By way of another example, the computing device 1100 can be used in a system that estimates the location of an object. The computing device 1100 includes at least one processor 1110 that executes instructions that are stored in a memory 1120. The instructions may, for instance, be instructions for implementing the process described above with reference to FIG. 5. The at least one processor 1110 may access the memory 1120 by way of a system bus 1130.

The computing device 1100 additionally includes a data store 1140 that is accessible by the at least one processor 1110 by way of the system bus 1130. The data store 1140 may, for example, include executable instructions. The computing device 1100 also includes an input interface 1150 that allows external devices to communicate with the computing device 1100. For instance, the input interface 1150 may be used to receive instructions from an external computer device, from a user, etc. The computing device 1100 also includes an output interface 1160 that interfaces the computing device 1100 with one or more external devices. For example, the computing device 1100 may display text or images by way of the output interface 1160.

External devices that communicate with the computing device 1100 via the input interface 1150 and the output interface 1160 can be included in an environment that provides substantially any type of user interface with which a user can interact. User interface types include, for example, graphical user interfaces and natural user interfaces. As a more specific example, a graphical user interface may accept input from a user employing input device(s) such as a keyboard, mouse, or remote control, and provide output on an output device such as a display. Further, a natural user interface may enable a user to interact with the computing device 1100 in a manner free from constraints imposed by input device such as keyboards, mice, or remote controls. Rather, a natural user interface can, for example, employ speech recognition, touch and stylus recognition, gesture recognition both on screen and adjacent to the screen, air gestures, head and eye tracking, voice and speech, vision, touch, gestures, or machine intelligence.

Additionally, while FIG. 11 illustrates the computing device 1100 as a single system, in other embodiments of the present invention, the computing device may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. For example, computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media.

Alternatively, or in addition, the functionality described herein can be performed, at least in part, by one or more hardware logic components. Hardware logic components include, for example, field-programmable gate arrays (FPGAs), application-specific integrated circuits (ASICs), application-specific standard products (ASSPs), system-on-a-chip systems (SOCs), and complex programmable logic devices (CPLDs).

Object Detection (Model)

Let the hypothesis $H_0$ correspond to the absence of an object and $H_{1,x}$ to the presence of an object. The probability densities for measurement vector y under the two hypotheses are then:

$$p_0(y) = \frac{1}{\sqrt{(2\pi)^P|\Upsilon|}}\exp\left(-\frac{1}{2}\|y - wy_b\|^2_{\Upsilon^{-1}}\right), \tag{Eq. 28}$$

$$p_{1,x}(y) = \frac{1}{\sqrt{(2\pi)^P|\Upsilon|}}\exp\left(-\frac{1}{2}\|y - wf(x)\|^2_{\Upsilon^{-1}}\right), \tag{Eq. 29}$$

where $y_b$ is the expected measurement in the absence of an object, $\gamma$ is the noise covariance matrix with $[\gamma]_{ii}=\alpha|y_i|$, a is a scalar parameter of the measurement system that is determined from the signal-to-noise ratio (SNR), w is a proportionality constant, $\|u\|_{\gamma-1}{}^2=u^T\gamma^{-1}u$, and T is the transpose operation. In the model, $y_b$, i.e., the expected measurement in the absence of an object, corresponds to the expected background signal, which would be noise when one is attempting to detect an object. Thus, by subtracting $y_b$, one is effectively improving the SNR, as one is subtracting out the background. This process will be discussed below with reference to FIGS. 15A-15D. Letting $\theta=[x,w]$ be the parameters of interest, the likelihood ratio test (LRT) is:

$$l(y,\theta)=\ln\frac{p_{1,x}(y)}{p_0(y)}=h^T(\theta)[y-wy_b]-c(\theta), \quad \text{(Eq. 30)}$$

where ln is the natural logarithm, $$h^T(\theta)=[wf(x)-wy_b]^T\Upsilon^{-1}[y-wy_b], \text{ and } c(\theta)=\frac{1}{2}\|wf(x)-wy_b\|^2_{\Upsilon^{-1}},$$

a constant for each θ. According to the Neyman-Pearson lemma, Equation 30 provides the highest probability of detection, $P_D$, for a specified false alarm rate, $P_F$.

The decision statistic $q=h^T(\theta)[y-wy_b]$ then has a normal distribution under the two hypotheses:

$$p_0(q)=\frac{1}{\sqrt{(2\pi)}\,\sigma_q}\exp\left(-\frac{q^2}{2\sigma_q^2}\right), \quad \text{(Ex. 31)}$$

$$p_1(q)=\frac{1}{\sqrt{(2\pi)}\,\sigma_q}\exp\left(-\frac{(q-\overline{q})^2}{2\sigma_q^2}\right), \quad \text{(Ex. 32)}$$

where both the mean $\overline{q}$ and variance $\sigma_q^2$ are equal to $\|wf(x)-wy_b\|_{\Upsilon\text{-}1}{}^2$. For a specified $P_F$, the detection threshold, $k_{P_F}(\theta)$ can then be determined as $k_{P_F}(\theta)=\sqrt{2}\sigma_q\text{erfcinv}(2P_F)$, where erfcinv is the inverse complimentary error function. Thus, an object is declared present if $q>k_{P_F}(\theta)$, and the probability of detection can be computed as:

$$P_D=\frac{1}{2}\text{erfc}\left(\frac{k_{P_F}(\theta)-\overline{q}}{\sqrt{2}\,\sigma_q}\right), \quad \text{(Eq. 33)}$$

where erfc is the complimentary error function.

Figure 12A:
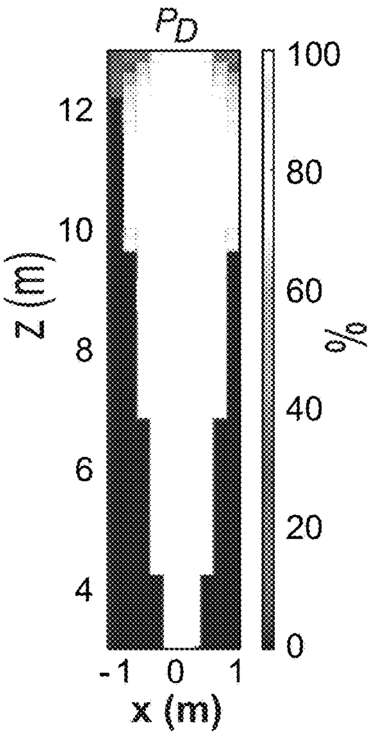
FIGS. 12A and 12B illustrate probability of detection simulation results for both the transmission and reflection geometries of FIGS. 8A and 8C of a model in accordance with one or more embodiments of the present invention.
Figure 12B:
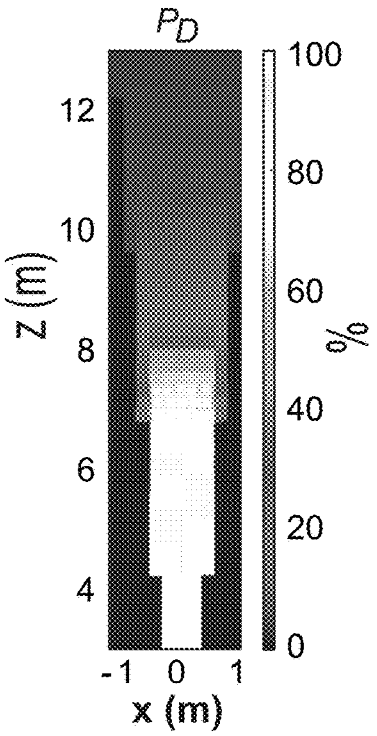

FIGS. 12A and 12B illustrate simulation results of Equation 33 for both the transmission and reflection geometries of FIGS. 8A and 8C. The SNRs used to generate FIGS. 12A and 12B were 30 dB and 40 dB, respectively, with these SNRs used to determine a per the method described in B. Z. Bentz et al., "Towards computational imaging for intelligence in highly scattering aerosols," Proceedings of SPIE, vol. 11424, art. no. 1142405 (2020), the contents of which are incorporated herein by reference. Lastly, w was set equal to 1. Experimentally, a could be estimated for a specific measurement setup and w could represent a linear calibration factor. FIGS. 12A and 12B used the optical parameters of the fog described in the Simulated Camera Measurements section above, which could be determined experimentally by inverting the model presented in the Light Propagation in Fog (Model) section above using a known calibration object.

Figure 13A:
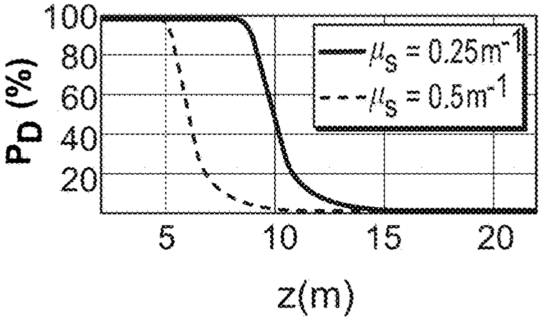
FIGS. 13A and 13B illustrate probability of detection simulation results as a function of object distance and scattering coefficient, respectively, of a model in accordance with one or more embodiments of the present invention.
Figure 13B:
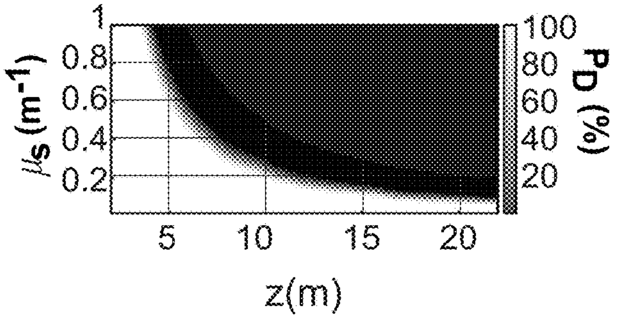

Calculations of the probability of detection $P_D$, i.e., Equation 33, as a function of object depth and $\mu_s$ are illustrated in FIGS. 13A and 13B. In this simulation, the object positions were centered on the z-axis, so that the object depth, z, is the distance from the camera to the object. The simulations that produced FIGS. 13A and 13B assumed $P_F$=3%, Γ=0.9, g=0.8, d=0.2 m, and SNR=30 dB, with the reflection geometry of FIG. 8C. FIG. 13A illustrates that $P_D$ decreases as the object depth is increased or $\mu_s$ is increased. FIG. 13B illustrates this more comprehensively as a function of both z and $\mu_s$ and suggests regions where the object could be classified as either detectable or not detectable. Based upon FIG. 13B and the assumptions therein, the maximum depth z where the object can be detected as a function of $\mu_s$ corresponds to the following fit:

$$z=21.98\exp(-12.08\mu_s)+9.175\exp(-1.063\mu_s). \quad \text{(Eq. 34)}$$

Object Localization (Model)

One may use the maximum likelihood (ML) estimation to locate the object. One may also characterize the object by estimating its diameter and reflection coefficient. Assuming an object is present or has been detected, using Equation 29, the ML can, for example, be formulated as:

$$c(r_0,d)=\underset{\eta,w}{\text{argmin}}\|y-wy_b-wS(r_0,d)-w\eta R(r_0,d)\|^2_{\Upsilon^{-1}}, \quad \text{(Eq. 35)}$$

where $c(r_0, d)$ is the negative log likelihood and is treated as a cost function and the goal is to estimate $r_0$, d, Γ, and w. In Equation 35, $S(r_0, d)$ corresponds to the light blocked by the object (see Equation 26), while $R(r_0, d)$ corresponds to the light reflected by the object (see Equation 27). To accomplish this, for each discretized position $r_0$ and object diameter d within pre-determined ranges of interest, $c(r_0, d)$ is first minimized with respect to Γ and w along the search directions, with $\tilde{w}$ and $\tilde{\eta}$ given by:

$$\tilde{w}=\frac{[y_b+S(r_0,d)+\tilde{\eta}R(r_o,d)]^T\Upsilon^{-1}y}{\|y_b+S(r_o,d)+\tilde{\eta}R(r_o,d)\|^2_{\Upsilon^{-1}}}, \quad \text{(Eq. 36)}$$

$$\tilde{\Gamma}=\frac{[y-\tilde{w}y_b-\tilde{w}S(r_o,d)]^T\Upsilon^{-1}R(r_o,d)}{\tilde{w}\|R(r_o,d)\|^2_{\Upsilon^{-1}}}, \quad \text{(Eq. 37)}$$

such that the estimated parameters are given by:

$$[\hat{r}_o,\hat{d}]=\underset{r_o,d}{\text{argmin}}\|y-\tilde{w}y_b-\tilde{w}S(r_o,d)-\tilde{w}\tilde{\Gamma}R(r_o,d)\|^2_{\Upsilon^{-1}}, \quad \text{(Eq. 38)}$$

$$\hat{w}=\tilde{w}(\hat{r}_o,\hat{d},\hat{\Gamma}), \text{ and} \quad \text{(Eq. 39)}$$

$$\hat{\Gamma}=\tilde{\Gamma}(\hat{r}_o,\hat{d},\hat{w}). \quad \text{(Eq. 40)}$$

In practice, for each interrogated $r_0$ and d, one first initializes $\tilde{\Gamma}$ to 0.5, computes $\tilde{w}$ using Equation 36, computes a new $\tilde{\Gamma}$ using Equation 37, then computes a new $\tilde{w}$, and repeats this process for ten iterations, which yields a good convergence. Note that Equations 36-40 may also be used to estimate the size d and/or the reflectivity Γ of the object via the ML formulation found in Equation 35.

Figure 14A:
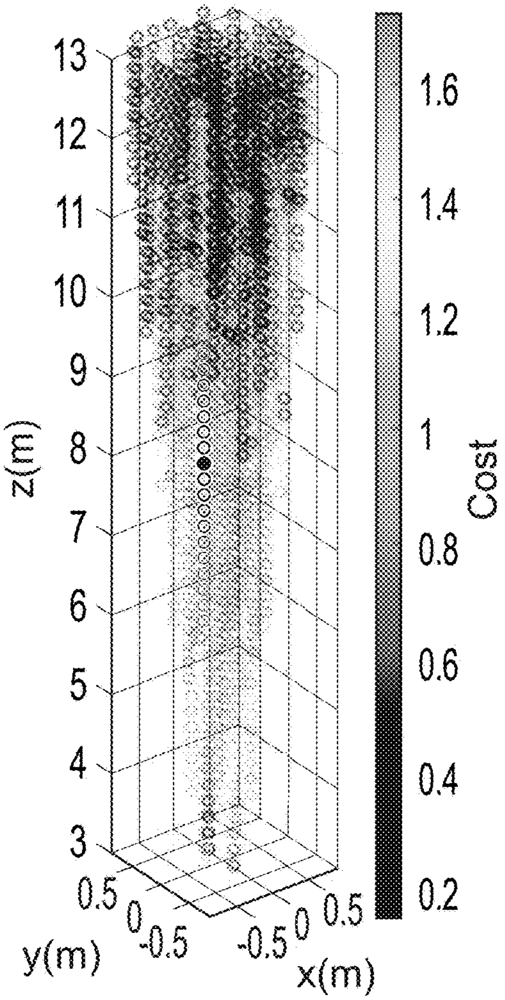
FIGS. 14A and 14B illustrate maximum likelihood estimated positions of an object for both the transmission and reflection geometries of FIGS. 8A and 8C of a model in accordance with one or more embodiments of the present invention.
Figure 14B:
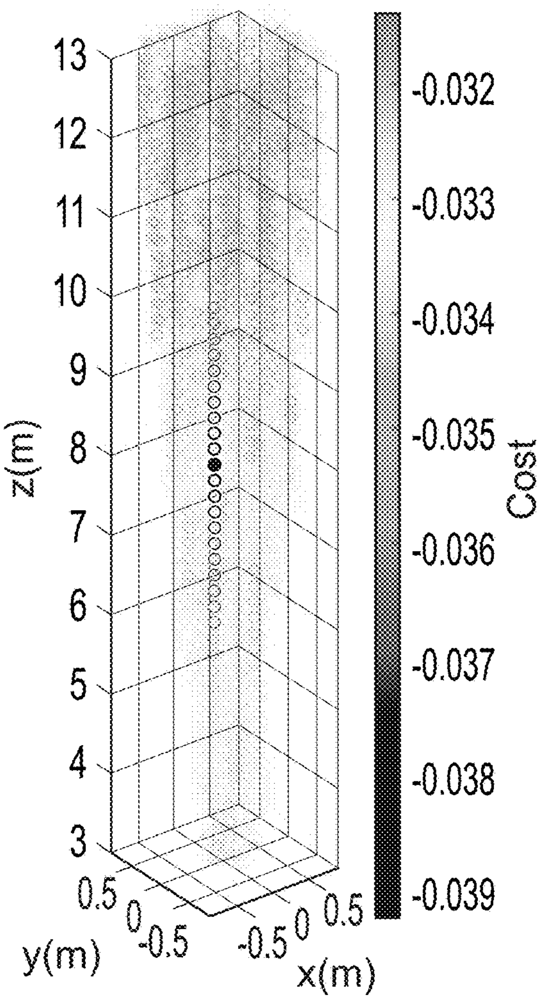

Simulated localization and calculation of Equation 35 is illustrated in FIGS. 14A and 14B for the transmission and reflection geometries of FIGS. 8A and 8C, respectively. The black dots in FIGS. 14A and 14B designate the correct location of the object, corresponding to a global minimum for the cost. The contrast in cost is much less for the reflection geometry in FIG. 14B because the object is almost undetectable. These results use $[\gamma]_{ii}=|y_i|$ rather than $[\gamma]_{ii}=\alpha|y_i|$, because a is assumed to be unknown. This results in an unknown scalar factor for the cost function, which has no effect on the optimization of Equation 35. The parameters $r_0$, d, and I were estimated successfully for each case, suggesting that objects in fog can be both localized and characterized using a single camera. It is believed that $r_0$ and Γ can be determined uniquely because the fog between the object and the camera affects the measurement differently, depending on the distance to the object and its reflection. While the above localized object is a spherical object, the same procedure could be adapted to localize objects with more complex shapes.

Figure 15A:
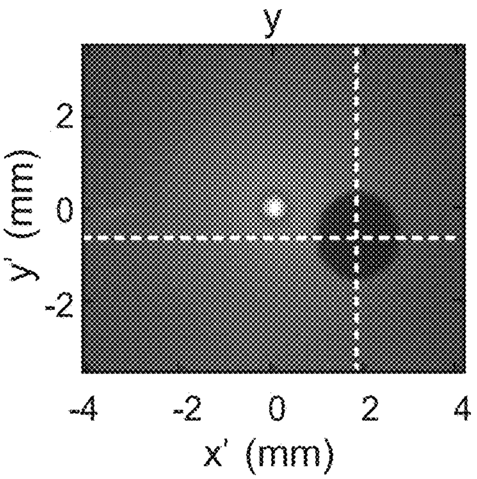
Figure 15B:
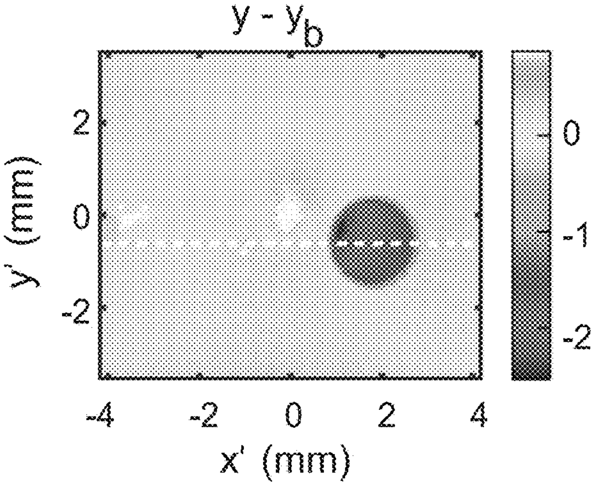
FIGS. 15B and 15D illustrate the images in FIGS. 15A and 15C, respectively, with the corresponding expected background signals subtracted.
Figure 15C:
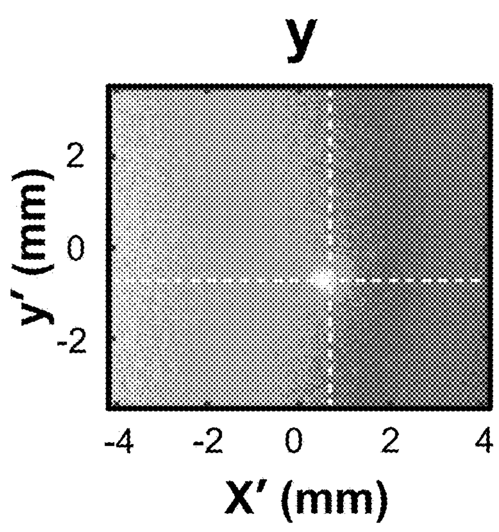
Figure 15D:
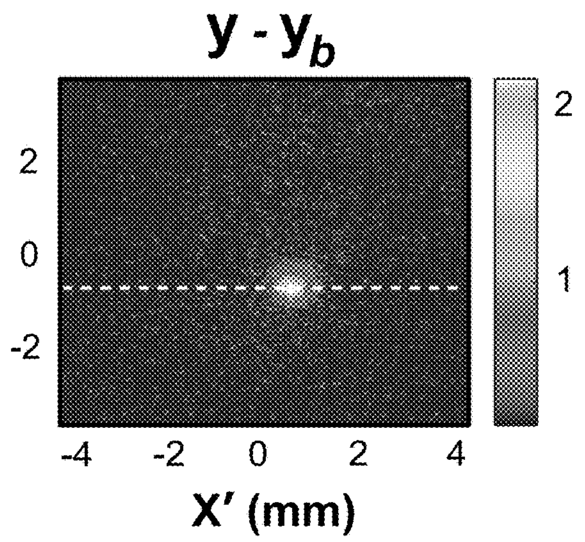

FIGS. 15A and 15C illustrate actual images taken with a system corresponding to at least one embodiment. FIGS. 15A and 15C correspond to the transmission and reflection geometries of FIGS. 8A and 8C, respectively. FIGS. 15B and 15D correspond to the images in FIGS. 15A and 15C, respectively, but with the expected background signals, i.e., $y_b$, subtracted. As is evident, the image contrast is greatly improved when the expected background signal is subtracted, thereby improving the results of both the detection and the localization processes. As can be seen, the object is suspended by a string, which is most evident in FIG. 15B. A transmissometer can also been seen in the left portions of FIGS. 15A and 15B.

Figure 16A:
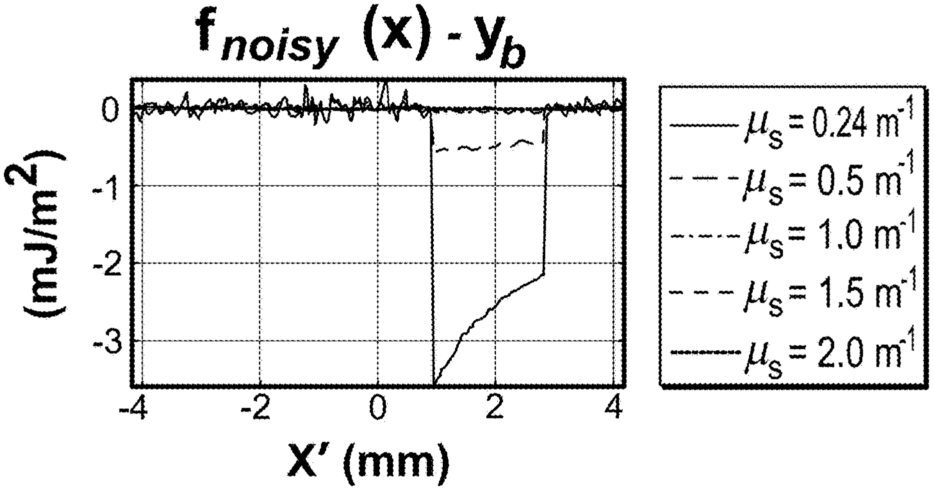
FIGS. 16A and 16B illustrate the effects of noise as a function of scattering coefficient of an object for both the transmission and reflection geometries of FIGS. 8A and 8C of a model in accordance with one or more embodiments of the present invention.
Figure 16B:
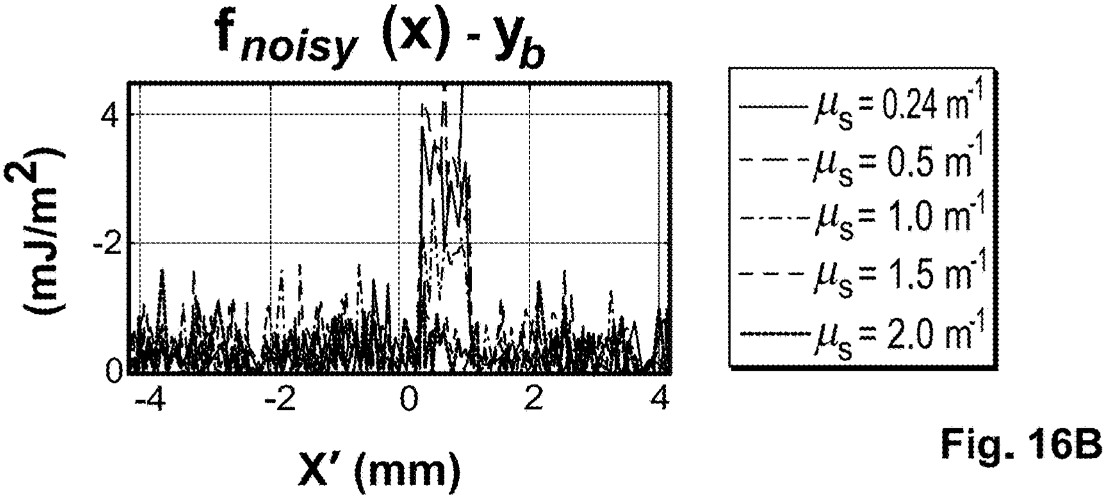

A shot noise model was used to generate simulated noisy data, $f_{noisy}$ (x), for positions along the dashed horizontal lines in FIGS. 15B and 15D (expected background signal, $y_b$, subtracted), with the results illustrated in FIGS. 16A and 16B, respectively, for different $\mu_s$ values and a SNR of 30 dB. For the transmission geometry case illustrated in FIG. 16A, when $\mu_s$ is larger than about 1.0 $m^{-1}$, the effect of the object on the measurement is less than the effect of the noise. Stated differently, $\mu_s$ must be less than about 1.0 $m^{-1}$ for an object to be detected. Similarly in the reflection geometry case illustrated in FIG. 16B, the object cannot be detected when $\mu_s$ is larger than about 1.5 $m^{-1}$. These same detection limits were confirmed with SNLFC experimental data.

While the above discussion regarding detection, localization, and background subtraction employed physics-based models, other embodiments may employ deep learning models, including physics-informed deep learning models. These physics-informed deep learning models may better overcome a changing expected background signal $y_b$ when, for example, heterogeneous fog or other aerosols begin to form or dissipate in the scene being imaged. In a like manner, these physics-informed deep learning models may be trained on anticipated objects, for example a person or a vehicle, as opposed to a sphere as was used in the above discussion, including in terms of size, shape, and reflectivity, thereby further improving detection and localization results.

Figure 17:
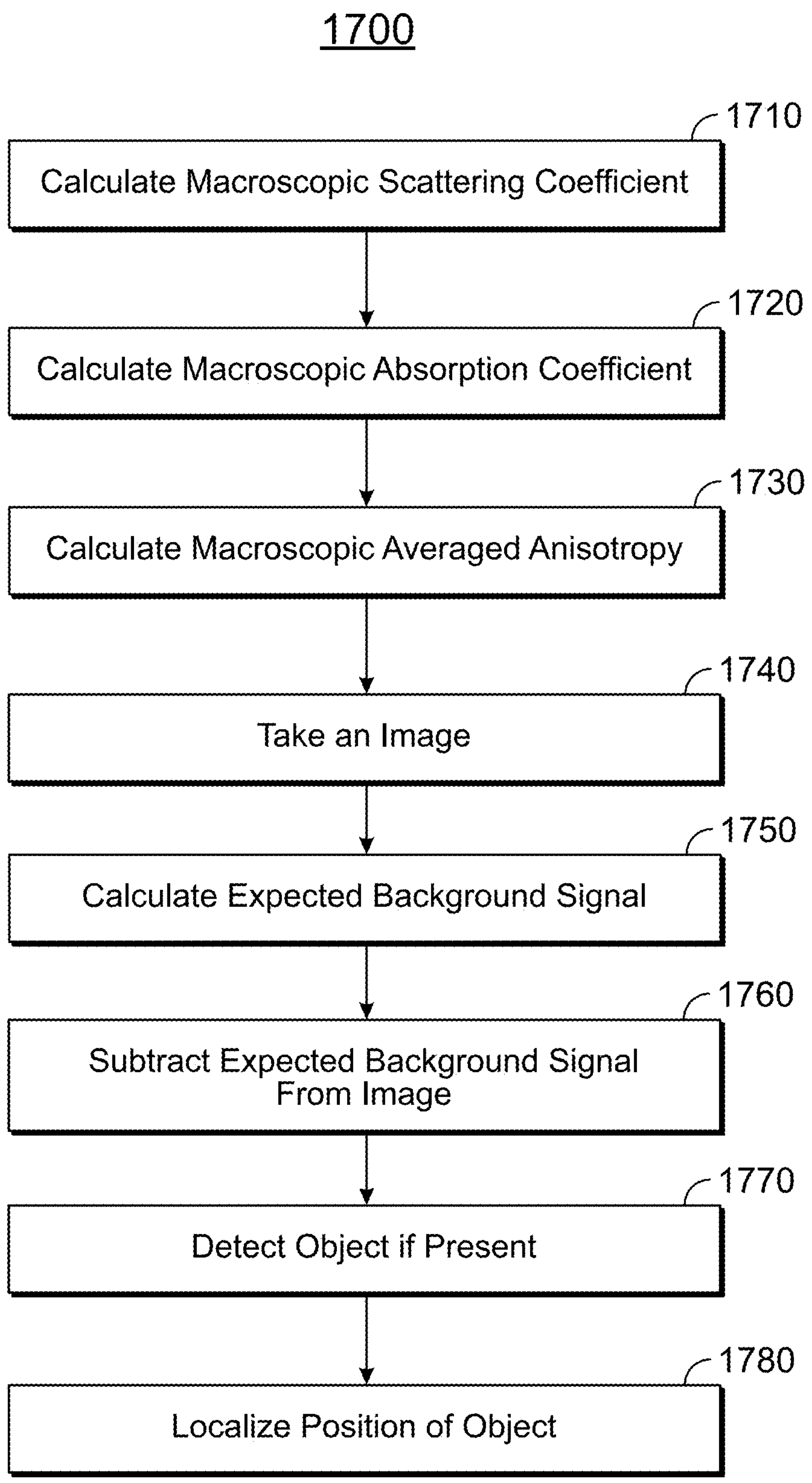
FIG. 17 illustrates a flowchart of the process whereby an object is detected, and its location estimated in accordance with one or more embodiments of the present invention.

FIG. 17 illustrates a flow chart of the modeling process 1700 in which an object is detected, and its location determined. The modeling process 1700 is in some ways the inverse of the modeling process 500 discussed above with respect to FIG. 5 in that rather than calculating the incident light from known positions (voxels), the incident light is known or measured, and one is determining the most likely position of an object that will produce the known incident light. In step 1710, the macroscopic scattering coefficient $\mu_s$ is calculated based upon Equation 16. In step 1720, the macroscopic absorption coefficient $\mu_a$ is calculated based upon Equation 17. In step 1730, the macroscopic averaged anisotropy g is calculated as $g=1-u's/\mu_s$ based upon Equation 18. In step 1740, an image is taken. In step 1750, the expected background signal $y_b$ is calculated. In step 1760, the expected background signal is subtracted from the image. In step 1770, an object, if present, is detected when the decision statistic q is greater than the detection threshold $k_{P_F}(\theta)$. In step 1780, if or when an object has been detected in step 1770, the position of the object is localized based upon Equation 35. As discussed above, a physics-informed deep learning model may be employed as an alternative to at least steps 1770 and 1780. In certain embodiments, the modeling process 1700 may stop after step 1760 if only the expected background signal needs to be subtracted from the image. In other embodiments, the modeling process 1700 may stop after step 1770 if only detection of an object is required.

While the above description has focused primarily on the application of the present invention to low-density media, for example fog, other embodiments of the present invention may be applied to higher density media. For example, some embodiments of the present invention may find application in biomedical imaging of tissue. For biomedical imaging of tissue, the location of, for example a tumor, i.e., an inhomogeneity, may be desired. In these embodiments of the present invention, additional modeling may be employed to determine the location of the inhomogeneity. See, for example, B. Z. Bentz et al., "Localization of Fluorescent Targets in Deep Tissue With Expanded Beam Illumination for Studies of Cancer and the Brain," IEEE Transactions on Medical Imaging, vol. 39, no. 7, pp. 2472-2481 (2020), the contents of which are incorporated herein by reference.

In other embodiments of the present invention, additional modeling may treat boundary conditions. See, for example, B. Z. Bentz et al., "Superresolution Diffuse Optical Imaging by Localization of Fluorescence." In yet other embodiments of the present invention, additional modeling using the finite element method (FEM) may be employed to model heterogeneous scattering material. See, for example, M. Schweiger and S. Arridge, "The Toast++ software suite for forward and inverse modeling in optical tomography," Journal of Biomedical Optics, vol. 19, art. no. 040801 (2014), the contents of which are incorporated herein by reference.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for determining a presence of an object in a moderately scattering aerosol with moving scatterers and a transport optical depth $\tau_t$ between approximately 0.2 and 2, the method comprising steps of:

determining a macroscopic scattering coefficient $\mu_s$ of the moderately scattering aerosol;

determining a macroscopic absorption coefficient $\mu_a$ of the moderately scattering aerosol;

determining a macroscopic averaged anisotropy g of the moderately scattering aerosol;

providing a light source that emits a known power spectral density;

providing a detector;

taking an image of the light source with the detector;

determining an expected background signal when the object is absent using a moderately scattering light transport model;

subtracting the expected background signal from the image to thereby create a difference image; and determining the presence of the object based upon the difference image;

wherein the moderately scattering light transport model is:

$$I(r,\Omega)=\frac{\mu_s}{4\pi}\int_0^\infty dR\exp[-(\mu_s+\mu_a)R][\phi(r-R\Omega)+3gJ(r-R\Omega)\cdot\Omega],$$

with I being a radiance, r being a position, Ω being a direction, R being a line of sight distance, ϕ being a fluence rate, and J being a flux density.

2. The method of claim 1, wherein the macroscopic scattering coefficient is a function of a particle density in the moderately scattering aerosol, a particle diameter distribution, and scattering cross-sections of particles that are a function of particle diameter;

wherein the macroscopic absorption coefficient is a function of the particle density in the moderately scattering aerosol, the particle diameter distribution, and absorption cross-sections of particles that are a function of the particle diameter; and wherein the macroscopic averaged anisotropy is a function of a particle density in the moderately scattering aerosol, a particle diameter distribution, scattering cross-sections of particles that are a function of particle diameter, and anisotropies of particles that are a function of particle diameter.

3. The method of claim 1, wherein each of the macroscopic scattering coefficient, the macroscopic absorption coefficient, and the macroscopic averaged anisotropy is determined using the moderately scattering light transport model.

4. The method of claim 1, wherein the step of determining the presence of the object determines the object is present when a decision statistic is greater than a detection threshold, the step of determining the presence of the object being based upon a likelihood ratio test.

5. The method of claim 4, wherein the decision statistic is a function of a ratio of a probability density in a presence of the object to a probability density in an absence of the object; and wherein the detection threshold is a function of a standard deviation of the decision statistic and an inverse complimentary error function of a specified false alarm rate.

6. The method of claim 4 further comprising a step of determining a location of the object when the object is determined to be present, the step of determining a location of the object being based upon a maximum likelihood estimation.

7. The method of claim 6, further comprising a step of determining at least one of a size of the object, a shape of the object, or a reflectivity of the object, the step of determining at least one of a size of the object, a shape of the object, or a reflectivity of the object being based upon the maximum likelihood estimation.

8. The method of claim 1, wherein the step of determining the presence of the object employs a deep learning model.

9. The method of claim 8 further comprising a step of determining a location of the object when the object is determined to be present, the step of determining a location of the object employing a deep learning model.

10. A system for determining a presence of an object in a moderately scattering aerosol with moving scatterers and a transport optical depth $\tau_t$ between approximately 0.2 and 2, the system comprising:

a detector adapted to take an image of a light source that emits light with a known power spectral density and to output the image;

a processor adapted to execute instructions; and a memory adapted to store instructions that, when executed by the processor, cause the processor to perform steps of:

determining a macroscopic scattering coefficient $\mu_s$ of the moderately scattering aerosol;

determining a macroscopic absorption coefficient $\mu_a$ of the moderately scattering aerosol;

determining a macroscopic averaged anisotropy g of the moderately scattering aerosol;

receiving the image from the detector;

determining an expected background signal when the object is absent using a moderately scattering light transport model;

subtracting the expected background signal from the image to thereby create a difference image; and determining the presence of the object based upon the difference image;

wherein the moderately scattering light transport model is:

$$I(r,\Omega)=\frac{\mu_s}{4\pi}\int_0^\infty dR\exp[-(\mu_s+\mu_a)R][\phi(r-R\Omega)+3gJ(r-R\Omega)\cdot\Omega],$$

with I being a radiance, r being a position, Ω being a direction, R being a line of sight distance, ϕ being a fluence rate, and J being a flux density.

11. The system of claim 10, wherein the macroscopic scattering coefficient is a function of a particle density in the moderately scattering aerosol, a particle diameter distribution, and scattering cross-sections of particles that are a function of particle diameter;

wherein the macroscopic absorption coefficient is a function of a particle density in the moderately scattering aerosol, a particle diameter distribution, and absorption cross-sections of particles that are a function of particle diameter;

wherein the macroscopic averaged anisotropy is a function of a particle density in the moderately scattering aerosol, a particle diameter distribution, scattering cross-sections of particles that are a function of particle diameter, and anisotropies of particles that are a function of particle diameter; and wherein each of the macroscopic scattering coefficient, the macroscopic absorption coefficient, and the macroscopic averaged anisotropy is determined using the moderately scattering light transport model.

12. The system of claim 10 further comprising:

a transmissometer adapted to measure a particle density in the moderately scattering aerosol; and a particle sizer adapted to measure a particle diameter distribution in the moderately scattering aerosol.

13. The system of claim 10, wherein the step of determining the presence of the object determines the object is present when a decision statistic is greater than a detection threshold, the step of determining the presence of the object is present being based upon a likelihood ratio test.

14. The system of claim 13, wherein the decision statistic is a function of a ratio of a probability density in a presence of the object to a probability density in an absence of the object; and wherein the detection threshold is a function of a standard deviation of the decision statistic and an inverse complimentary error function of a specified false alarm rate.

15. The system of claim 13, wherein the memory further stores instructions that, when executed by the processor, cause the processor to perform a step of when the object is determined to be present, determining a location of the object based upon a maximum likelihood estimation.

16. The system of claim 15, wherein the memory further stores instructions that, when executed by the processor, cause the processor to perform a step of determining at least one of a size of the object, a shape of an object, or a reflectivity of the object, the step of determining at least one of a size of the object, a shape of the object, or a reflectivity of the object being based upon the maximum likelihood estimation.

17. The system of claim 10, wherein the memory further stores instructions that, when executed by the processor, cause the processor to perform the step of determining the presence of the object employing a deep learning model.

18. The system of claim 17, wherein the memory further stores instructions that, when executed by the processor, cause the processor to perform a step of determining a location of the object when the object is determined to be present, the step of determining a location of the object employing a deep learning model.

19. A non-transitory computer-readable storage media comprising instructions to determine a presence of an object in a moderately scattering aerosol with moving scatterers and a transport optical depth $\tau_t$ between approximately 0.2 and 2, the instructions implement steps comprising:

determining a macroscopic scattering coefficient $\mu_s$ of the moderately scattering aerosol using a moderately scattering light transport model, the macroscopic scattering coefficient $\mu_s$ being a function of a particle density in the moderately scattering aerosol, a particle diameter distribution, and scattering cross-sections of particles that are a function of particle diameter;

determining a macroscopic absorption coefficient $\mu_a$ of the moderately scattering aerosol using the moderately scattering light transport model, the macroscopic absorption coefficient La being a function of a particle density in the moderately scattering aerosol, a particle diameter distribution, and absorption cross-sections of particles that are a function of particle diameter;

determining a macroscopic averaged anisotropy g of the moderately scattering aerosol using the moderately scattering light transport model, the macroscopic averaged anisotropy g being a function of a particle density in the moderately scattering aerosol, a particle diameter distribution, scattering cross-sections of particles that are a function of particle diameter, and anisotropies of particles that are a function of particle diameter;

taking an image with a detector of a light source that emits light with a known power spectral density;

determining an expected background signal when the object is absent using the moderately scattering light transport model; and subtracting the expected background signal from the image to thereby create a difference image; and determining the presence of the object based upon the difference image;

wherein the moderately scattering light transport model is:

$$I(r,\Omega)=\frac{\mu_s}{4\pi}\int_0^\infty dR\,\exp[-(\mu_s+\mu_a)R][\phi(r-R\Omega)+3gJ(r-R\Omega)\cdot\Omega],$$

with I being a radiance, r being a position, Ω being a direction, R being a line of sight distance, ϕ being a fluence rate, and J being a flux density.

20. The non-transitory computer-readable storage media of claim 19, wherein the step of determining the presence of the object determines the object is present when a decision statistic is greater than a detection threshold, the step of determining the presence of the object being based upon a likelihood ratio test; and wherein the steps further comprise a step of determining a location of the object when the object is determined to be present, the step of determining a location of the object being based upon a maximum likelihood estimation.

* * * * *